US008947762B2

(12) United States Patent
Mochizuki et al.

(10) Patent No.: US 8,947,762 B2
(45) Date of Patent: Feb. 3, 2015

(54) FINE PIXEL PITCH ELECTROPHORETIC DISPLAY

(71) Applicant: Invent Research LLC, Tartu (EE)

(72) Inventors: Akihiro Mochizuki, Louisville, CO (US); Madis-Marius Vahtre, Tartu (EE); Laura Pait, Tartu (EE)

(73) Assignee: Visitret Displays OU, Tartu (EE)

( * ) Notice: Subject to any disclaimer, the term of this patent is extended or adjusted under 35 U.S.C. 154(b) by 0 days.

(21) Appl. No.: 13/736,485

(22) Filed: Jan. 8, 2013

(65) Prior Publication Data

US 2014/0192400 A1 Jul. 10, 2014

(51) Int. Cl.
*G02B 26/00* (2006.01)
*G02F 1/167* (2006.01)
*G02F 1/01* (2006.01)
*G02F 1/17* (2006.01)
*G02F 1/00* (2006.01)

(52) U.S. Cl.
CPC .............. *G02F 1/167* (2013.01); *G02F 1/0102* (2013.01); *G02F 1/172* (2013.01); *G02F 1/0027* (2013.01)
USPC ........................................................ 359/296

(58) Field of Classification Search
USPC ............ 359/296, 900; 345/107; 438/758, 778
See application file for complete search history.

(56) References Cited

U.S. PATENT DOCUMENTS

| | | | | |
|---|---|---|---|---|
| 5,389,287 | A * | 2/1995 | Nishiyama et al. | 252/299.01 |
| 6,865,010 | B2 * | 3/2005 | Duthaler et al. | 359/296 |
| 7,639,342 | B2 * | 12/2009 | Hwang et al. | 349/172 |
| 2004/0090398 | A1 * | 5/2004 | Takeuchi et al. | 345/75.2 |
| 2006/0249769 | A1 * | 11/2006 | Eder et al. | 257/296 |
| 2007/0200093 | A1 * | 8/2007 | West et al. | 252/299.01 |
| 2013/0286465 | A1 * | 10/2013 | Chen et al. | 359/296 |

OTHER PUBLICATIONS

Hiji, N. et al., (2012). "Novel Color Electrophoretic E-Paper Using Independently Movable Colored Particles," *SID 2012 Digest*: 85-87.
Fujii, K., (Nov. 2004). "Dependence of Polymerization Time on Thermal Initiator Concentration," *Tokyo Gakugei University Repository* Sect. 6. 56: 5-8.
Livv, J. et al., International Application No. PCT/EP2010/057865 filed on Jun. 6, 2010; 19 pages.

* cited by examiner

*Primary Examiner* — Tuyen Tra
(74) *Attorney, Agent, or Firm* — Morrison & Foerster LLP

(57) ABSTRACT

High display duty ratio and fast optical response electrophoretic display technology is presented by using an antiferroelectric coupling torque. The invention also consequently enables fine pixel pitch resolution by introducing photo lithography based switching element preparation method. Newly introduced casting film method for optical switching element preparation enables extremely fine size of switching element based on current well-established flat panel display volume manufacturing process.

18 Claims, 30 Drawing Sheets

A structure of FOP (Filter on Pixel)

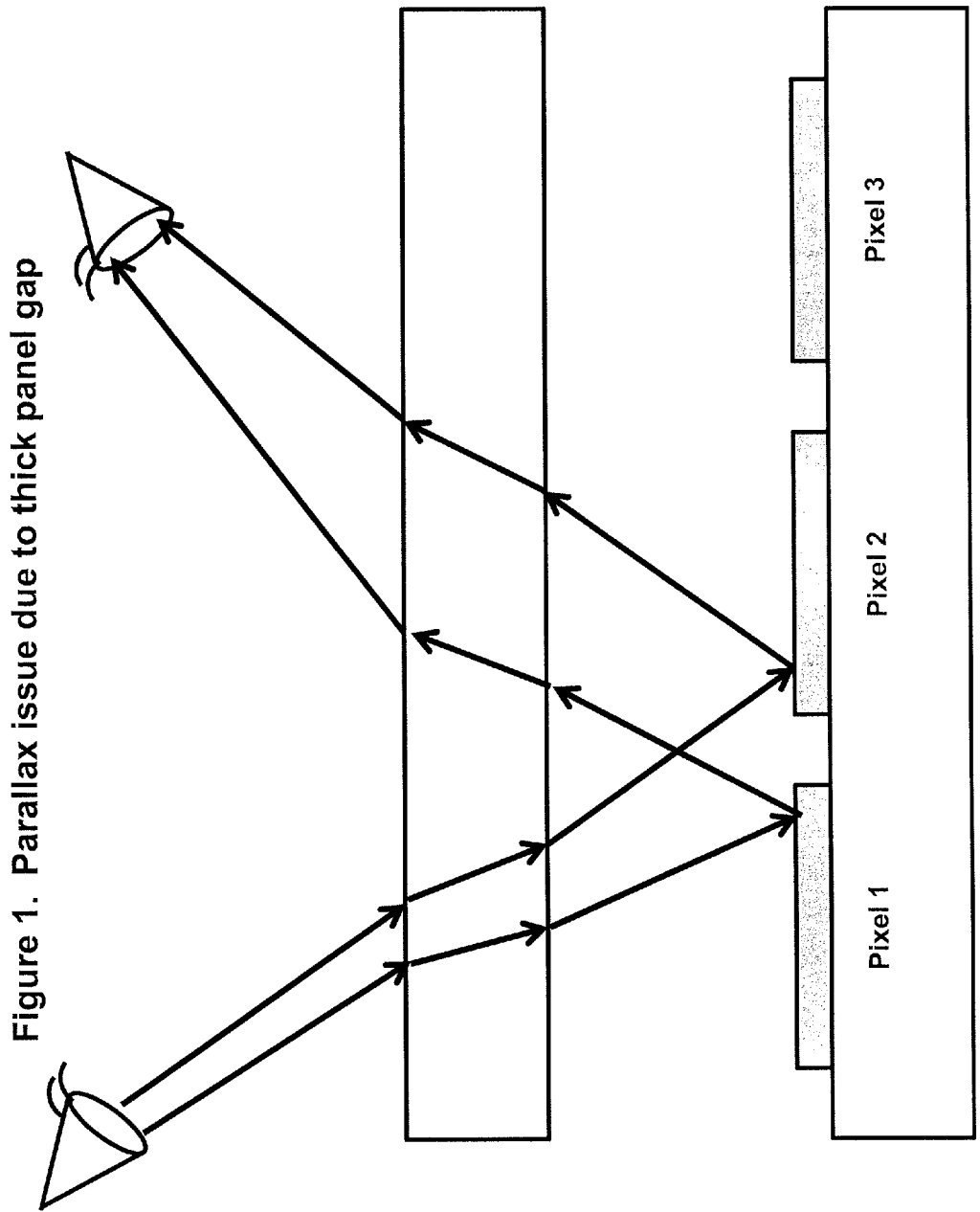

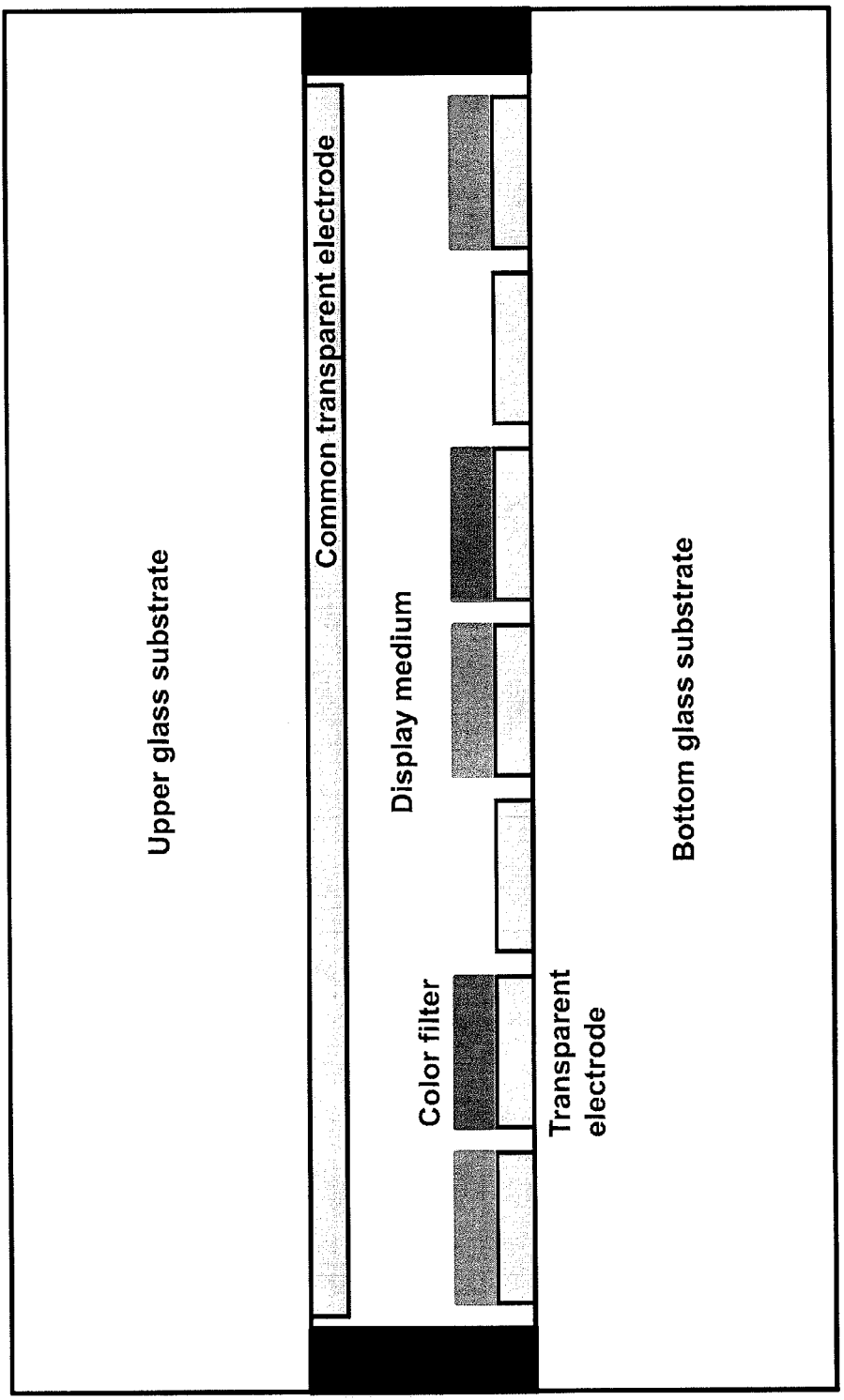

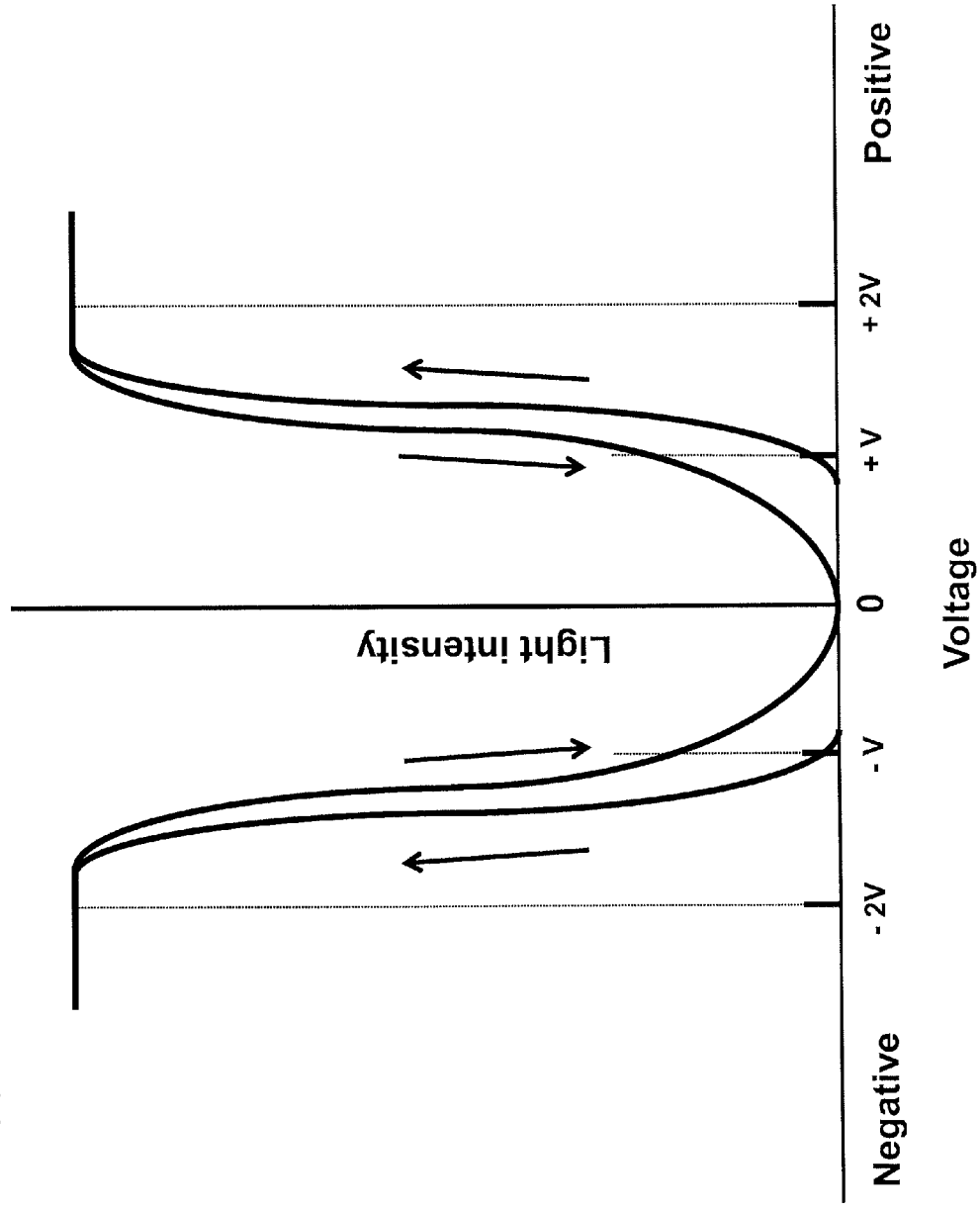
Figure 3 (a). General electro-optic property of anti-ferroelectric switching

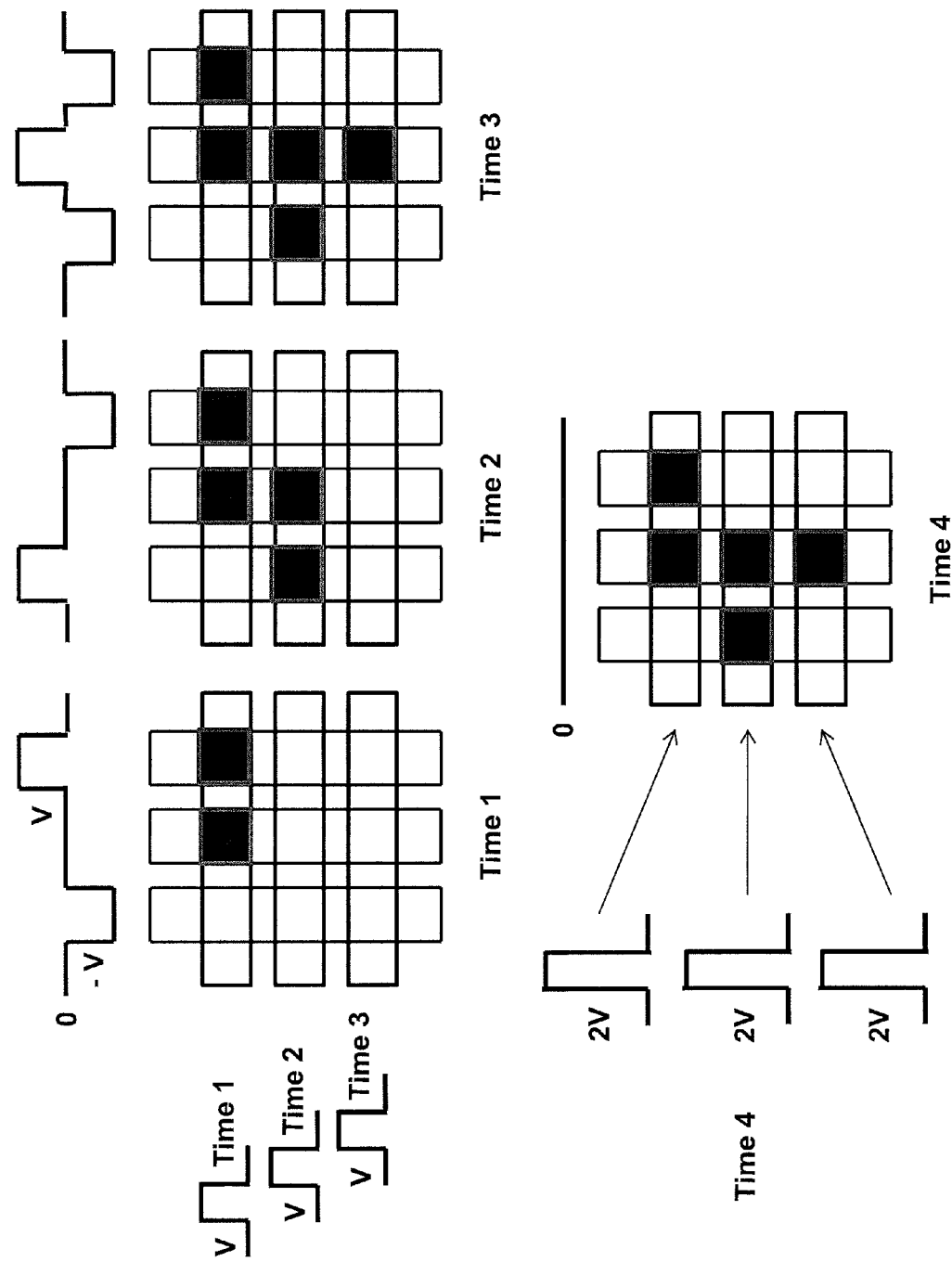

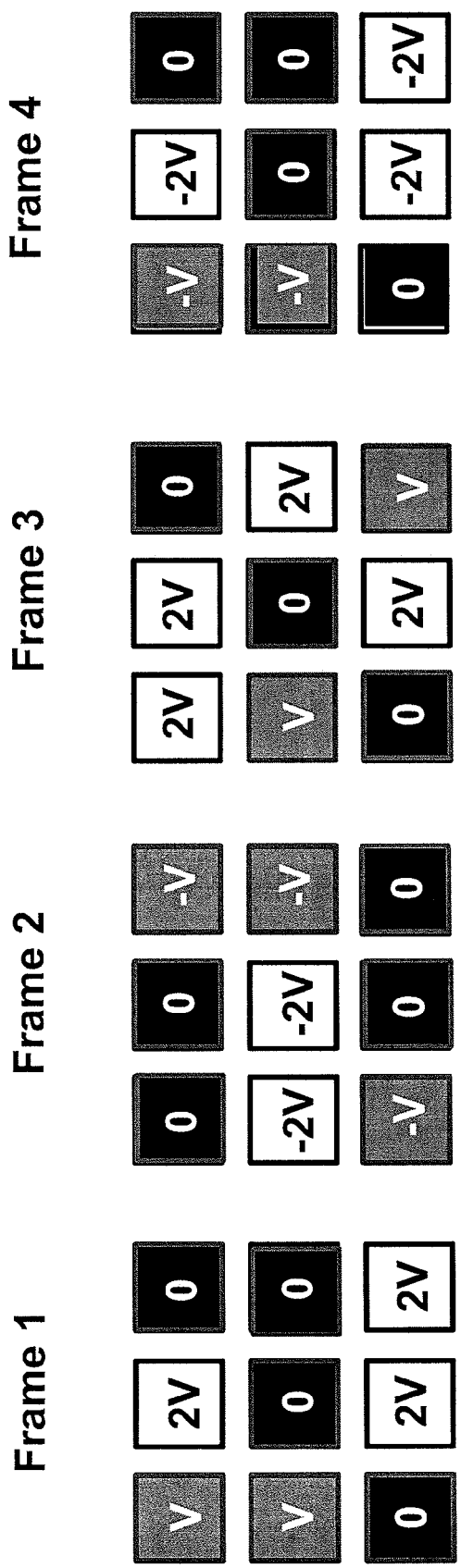
Figure 4. General driving scheme for refreshing writing

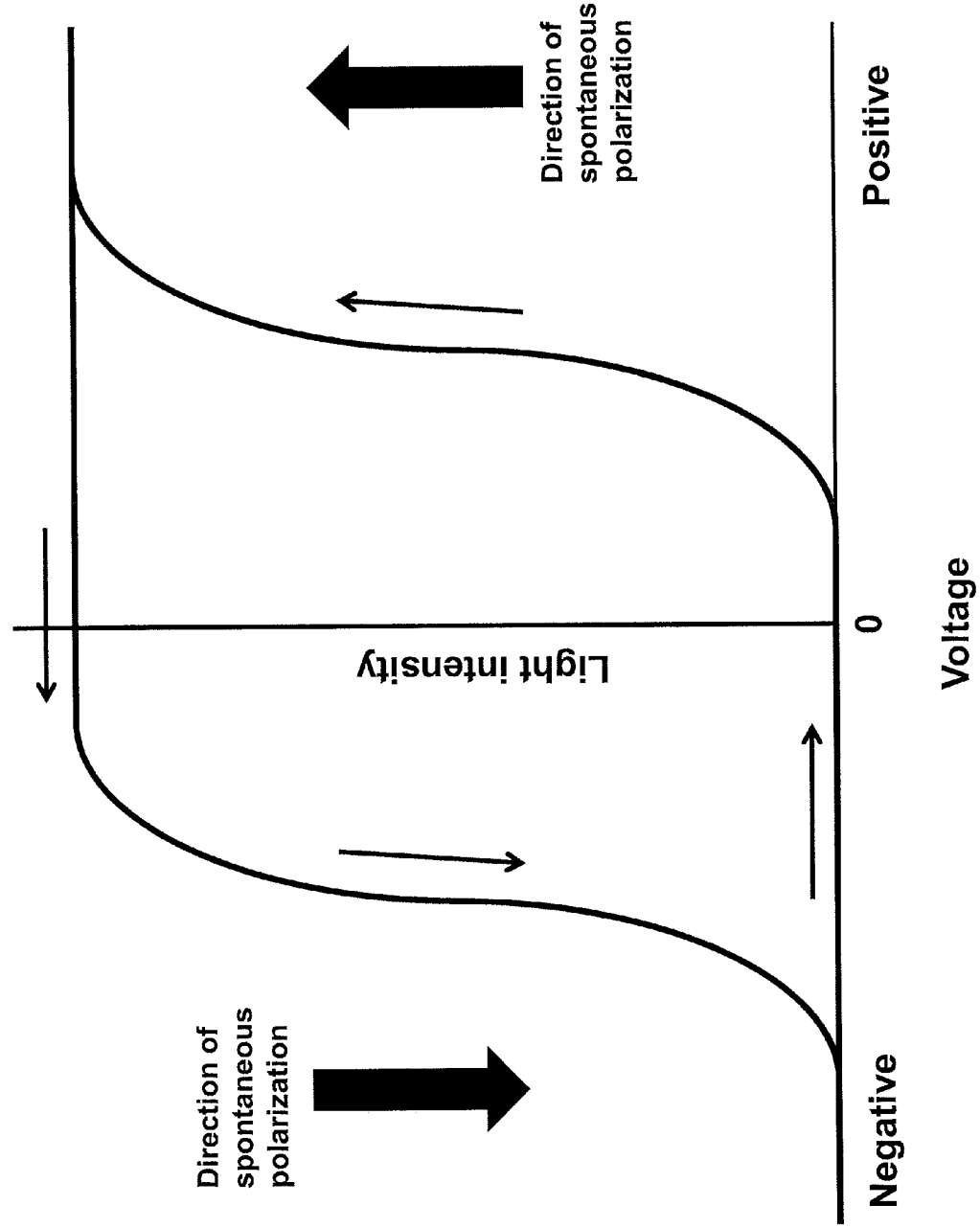
Figure 5 (a). An electro-optic property of ferroelectric switching

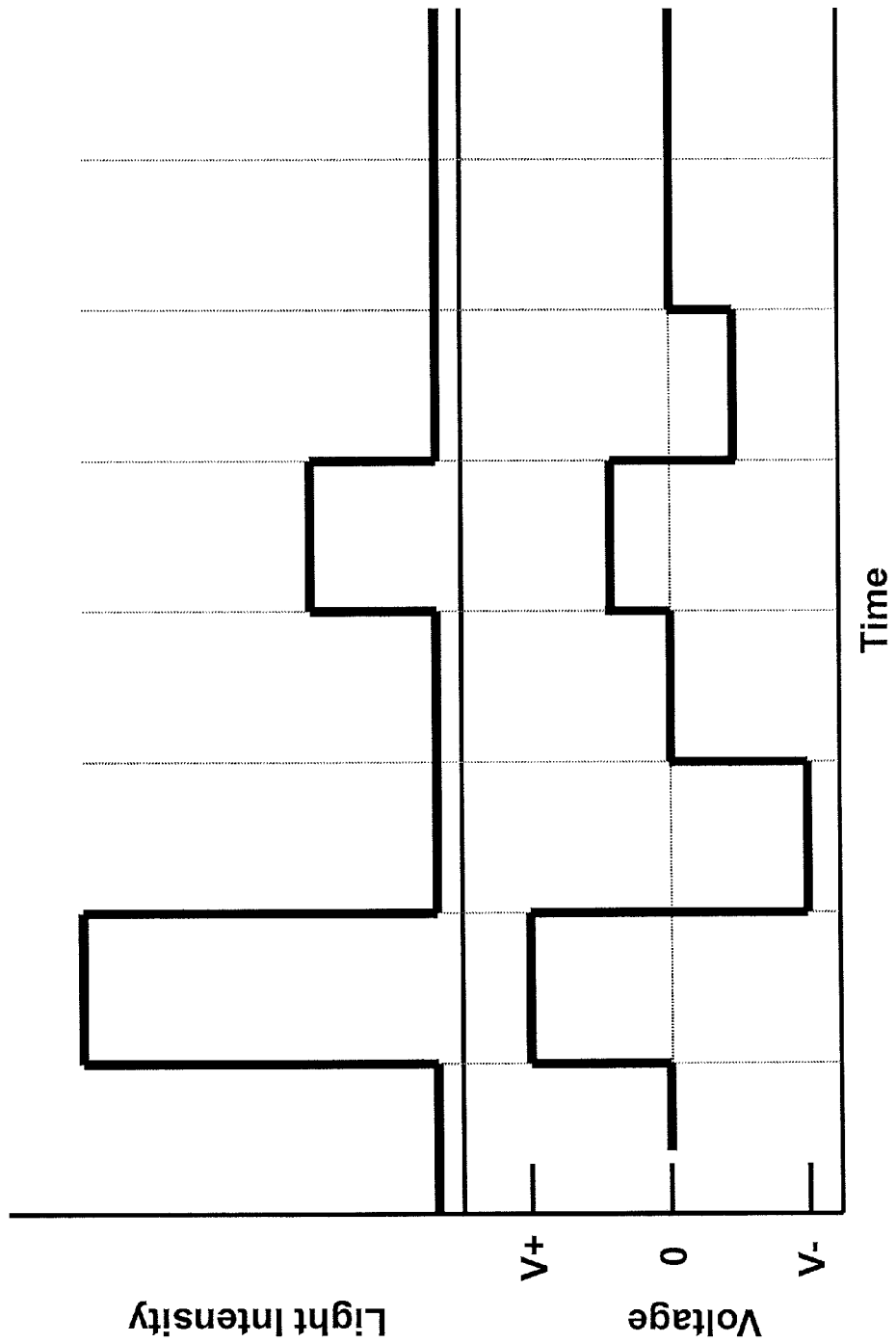
Figure 5 (b). A display duty ratio of ferroelectric base switching

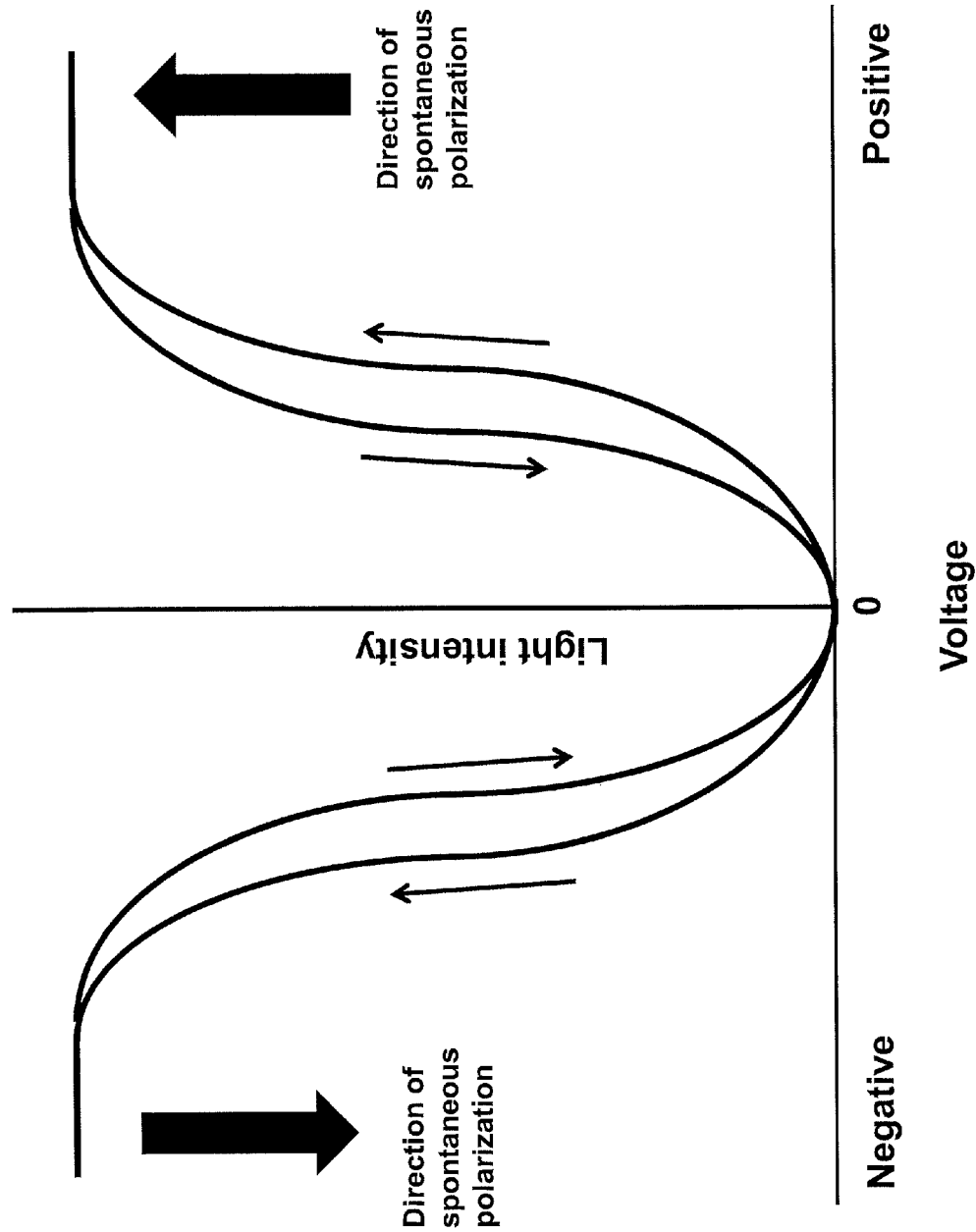
Figure 6 (a). An electro-optic property of Anti-ferroelectric switching

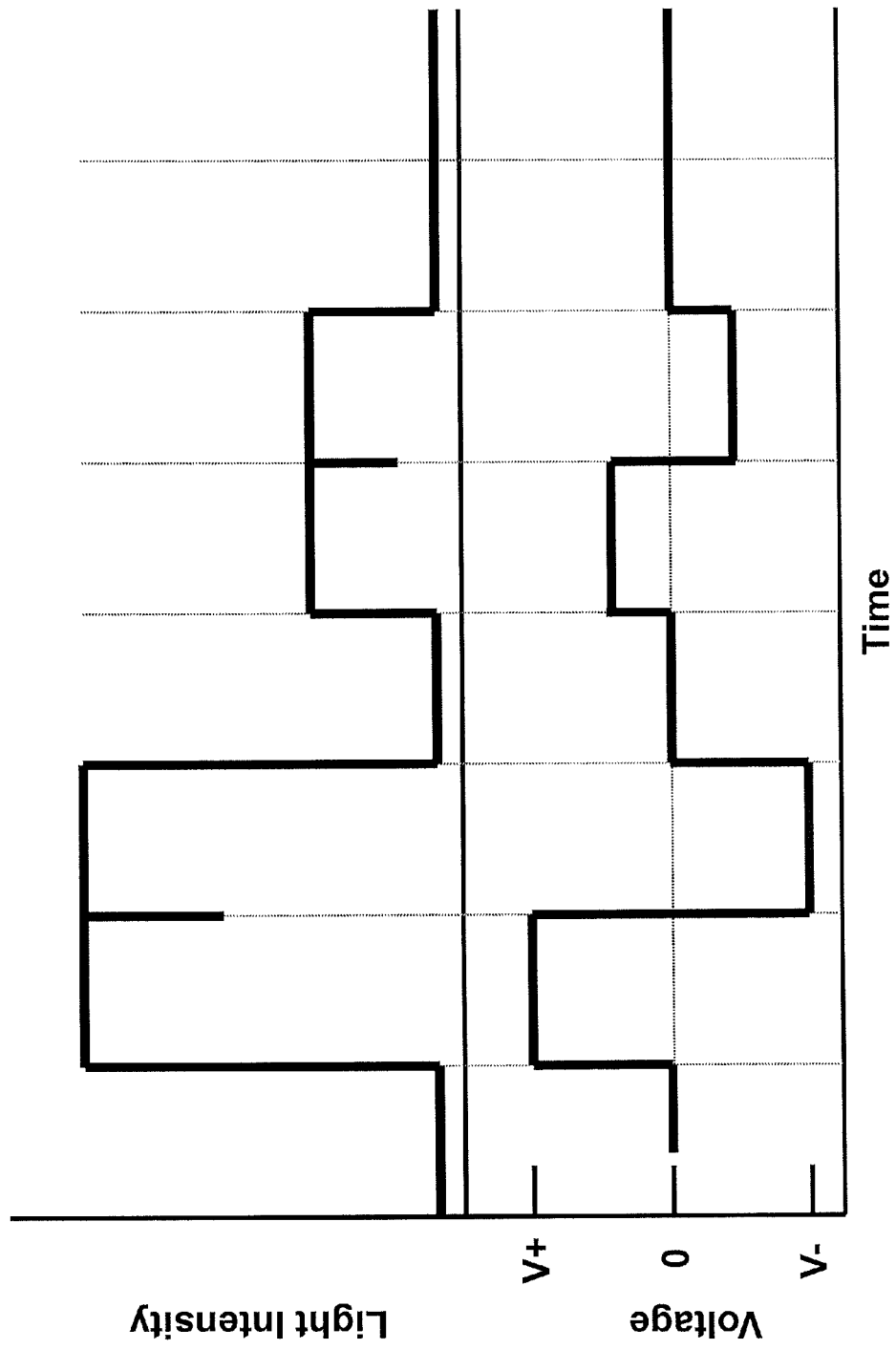
Figure 6 (b). A display duty ratio of Anti-ferroelectric base switching

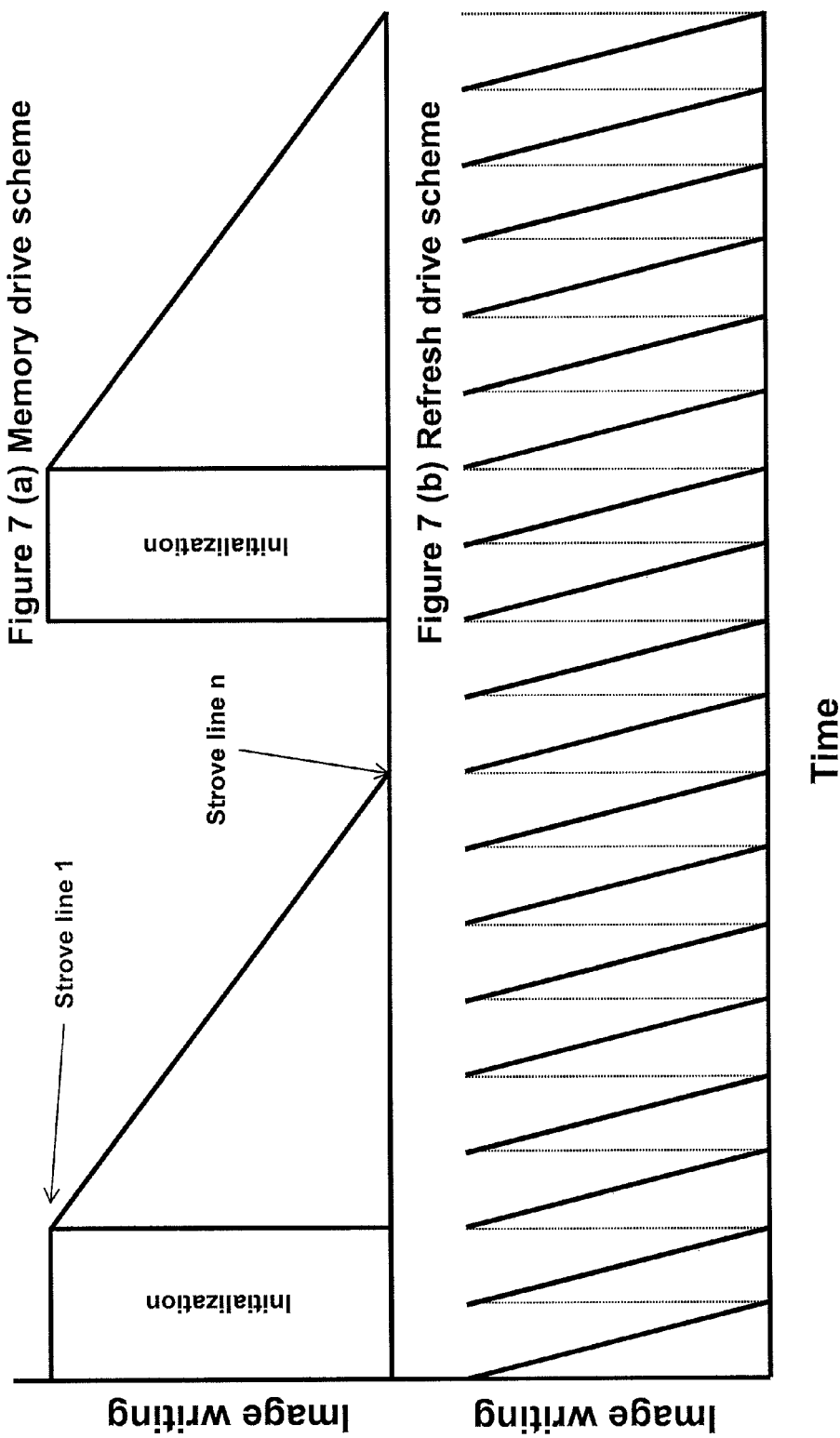
Figure 7. Difference in frame writing scheme between memory type and refreshing type

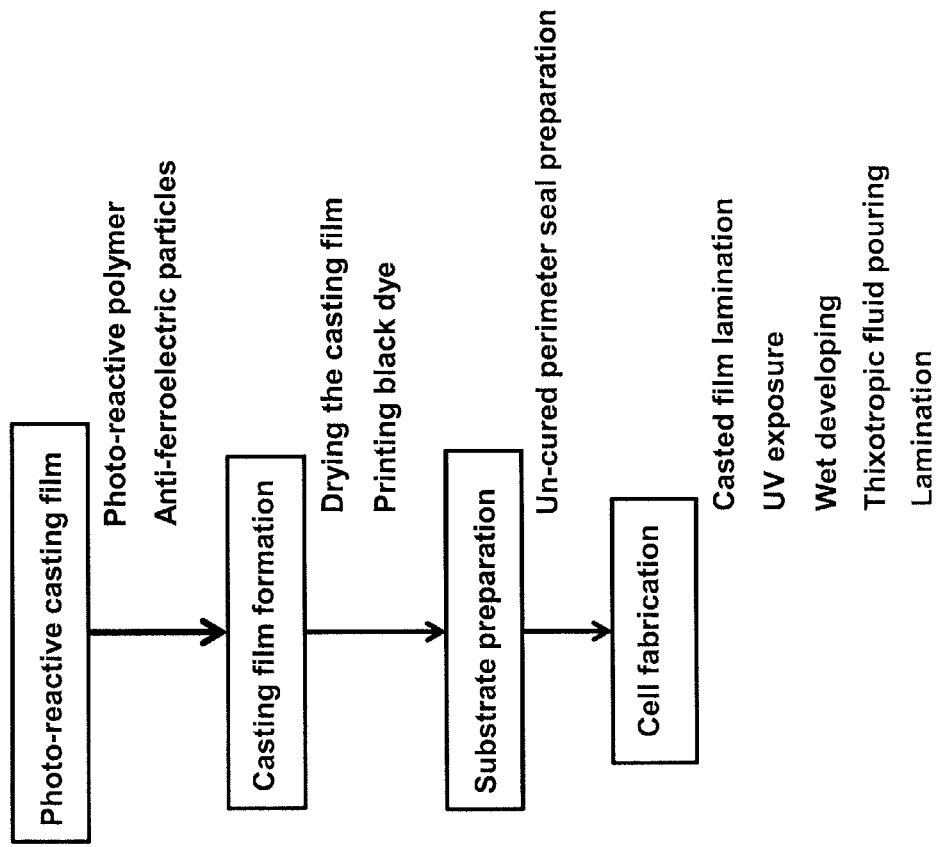
Figure 8. An overall process flow of fine pitch spontaneous polarization based electrophoretic switching media preparation

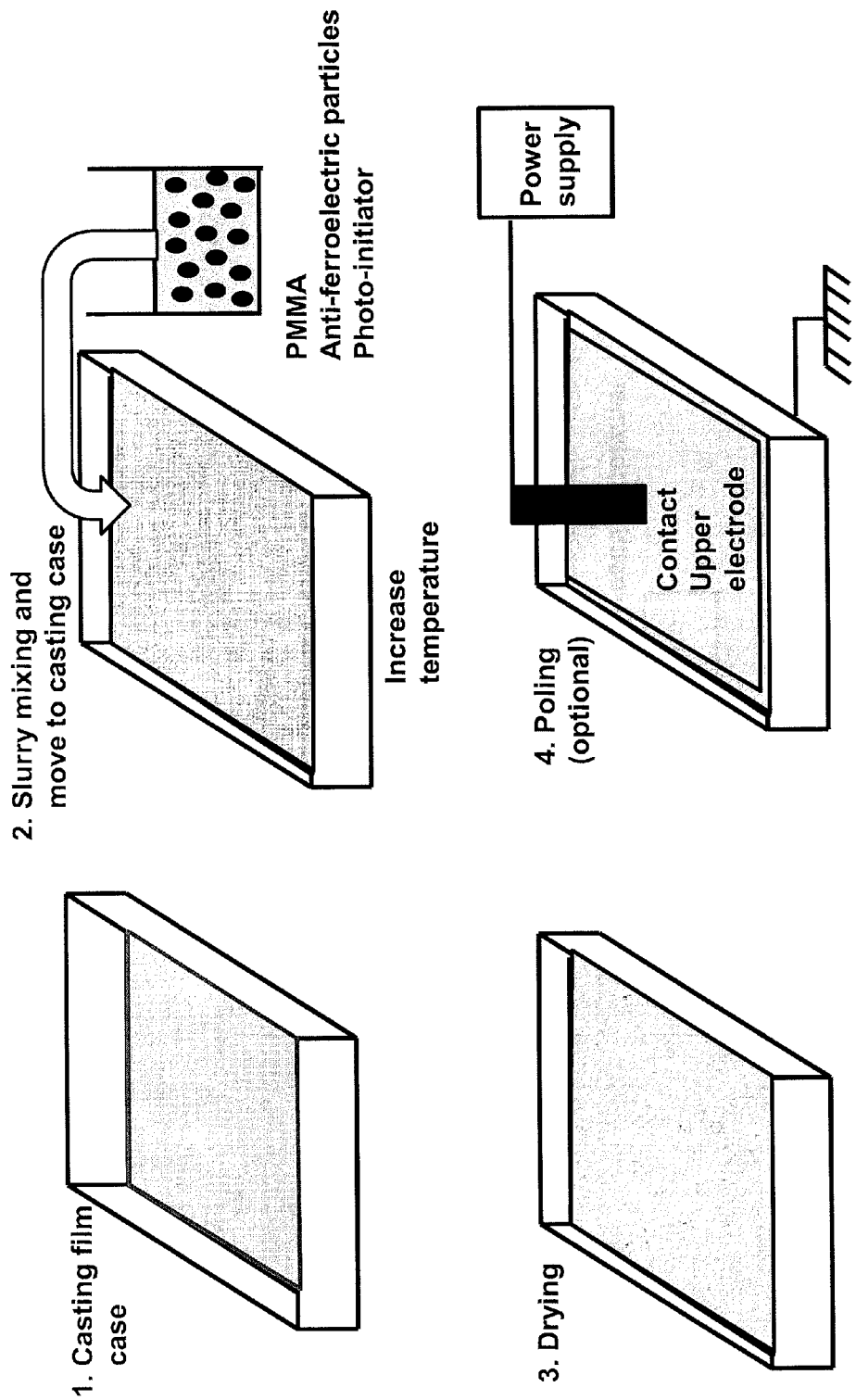
Figure 9. A spontaneous polarization based switching casting film preparation process

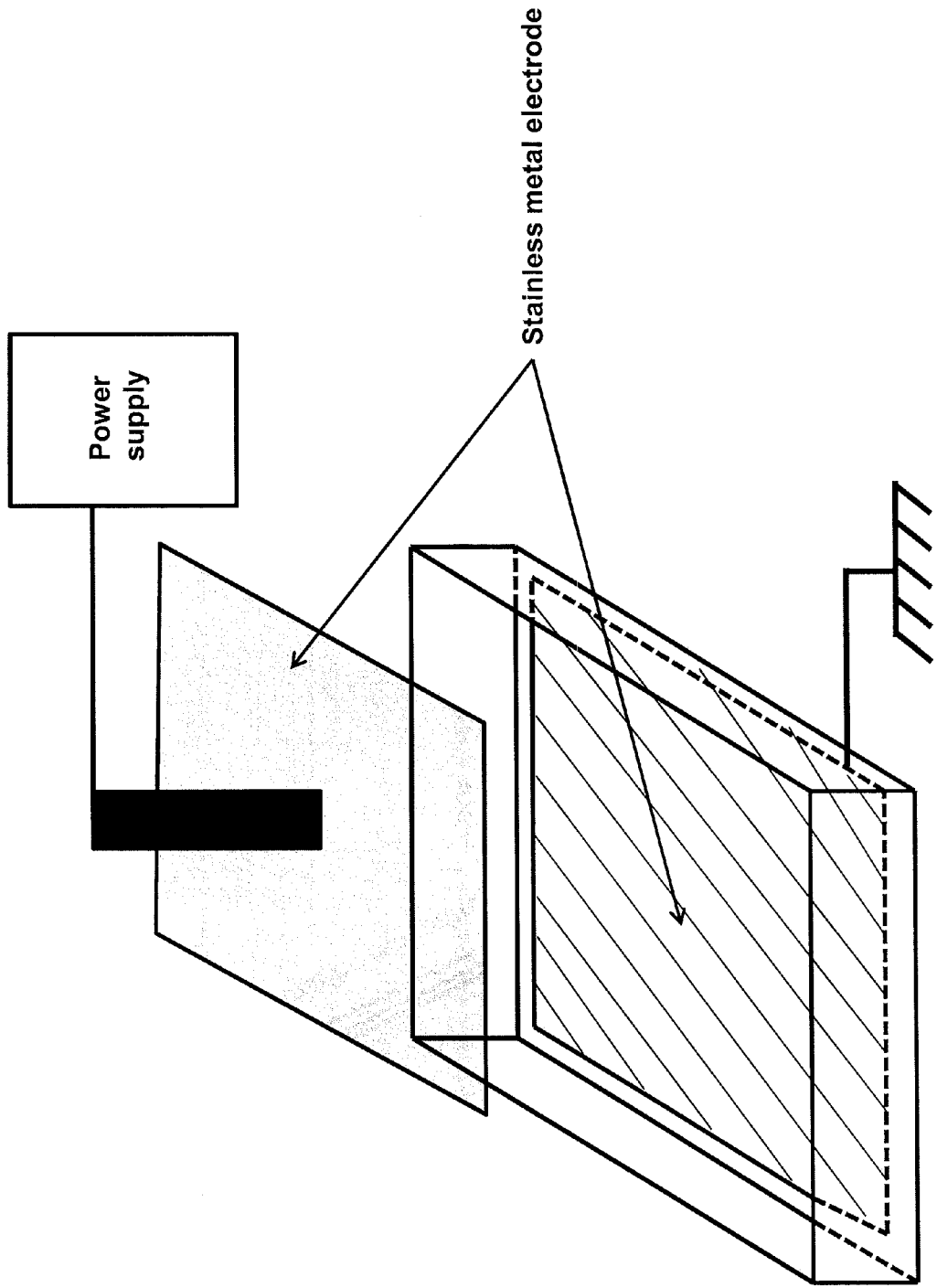
Figure 10. A casting film case equipped with electro-poling electrodes

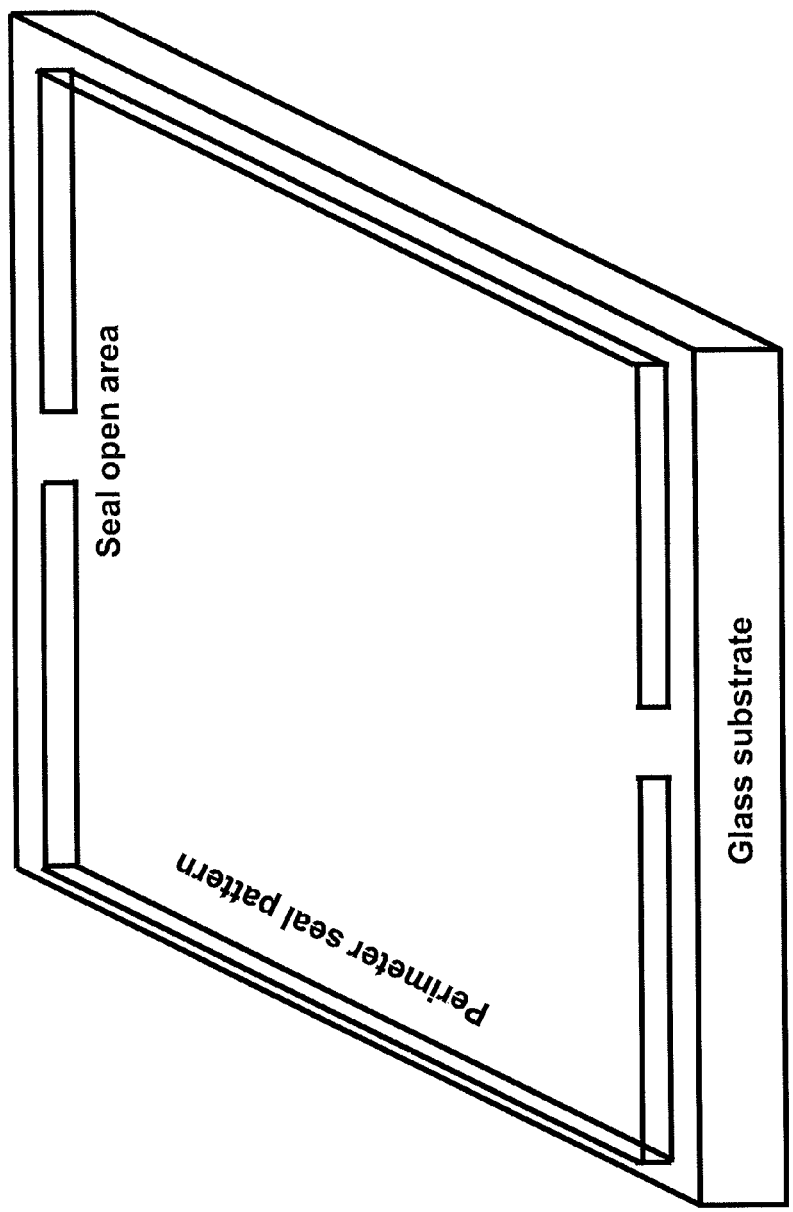
Figure 11. A half-cured perimeter seal pattern

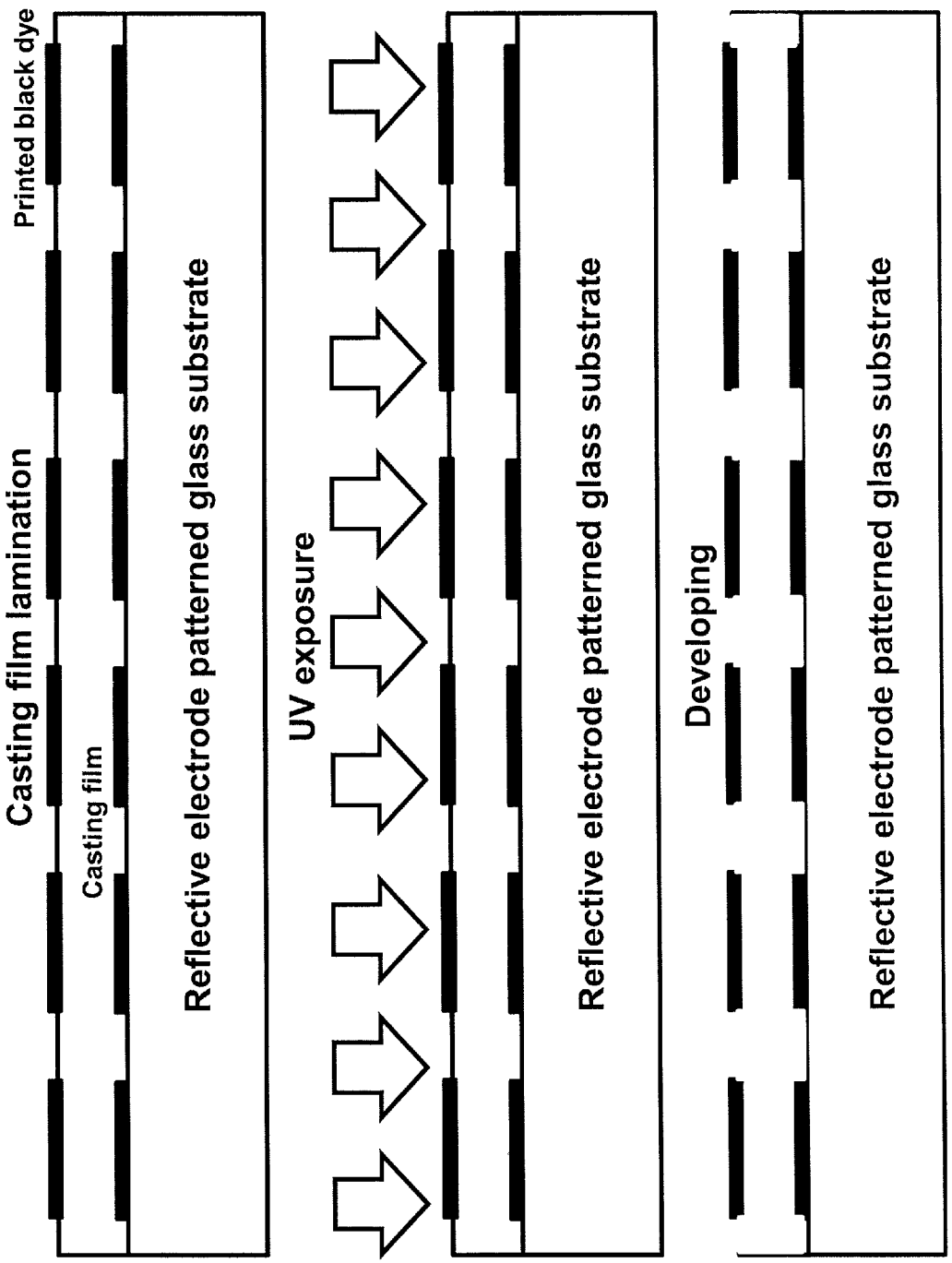
Figure 12. A patterning method of casting film with UV lithography

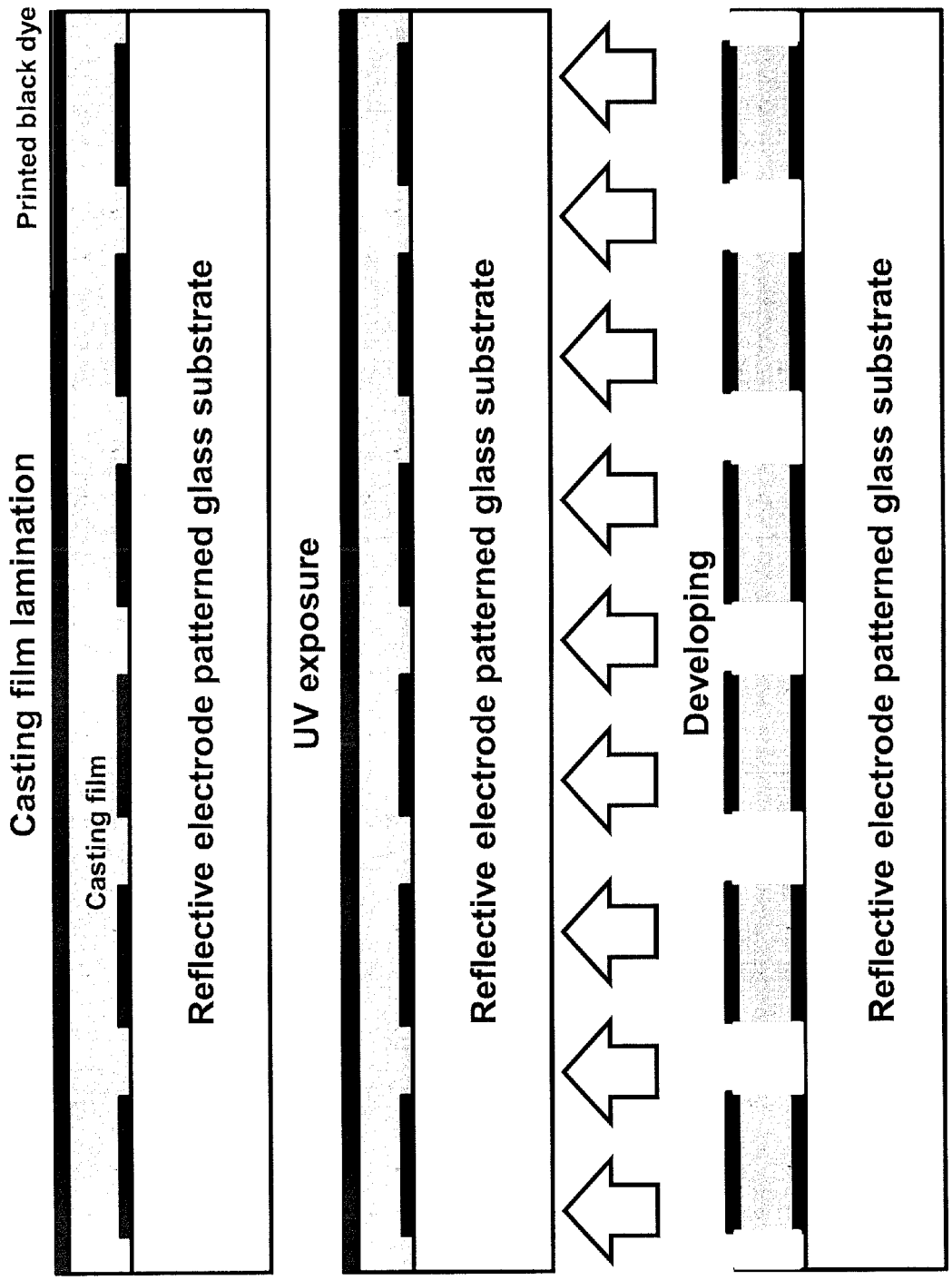

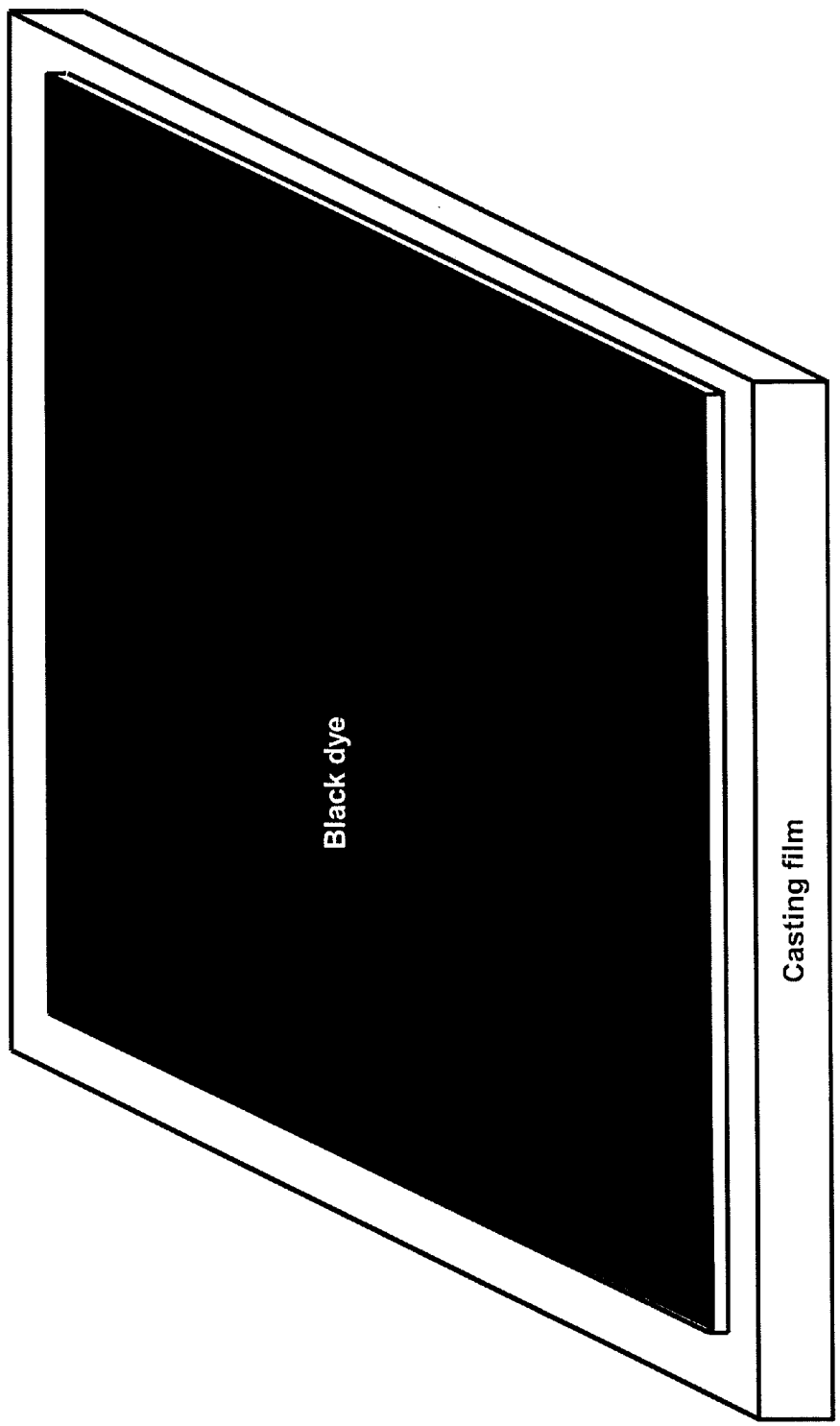
Figure 14. A coloration by printing method

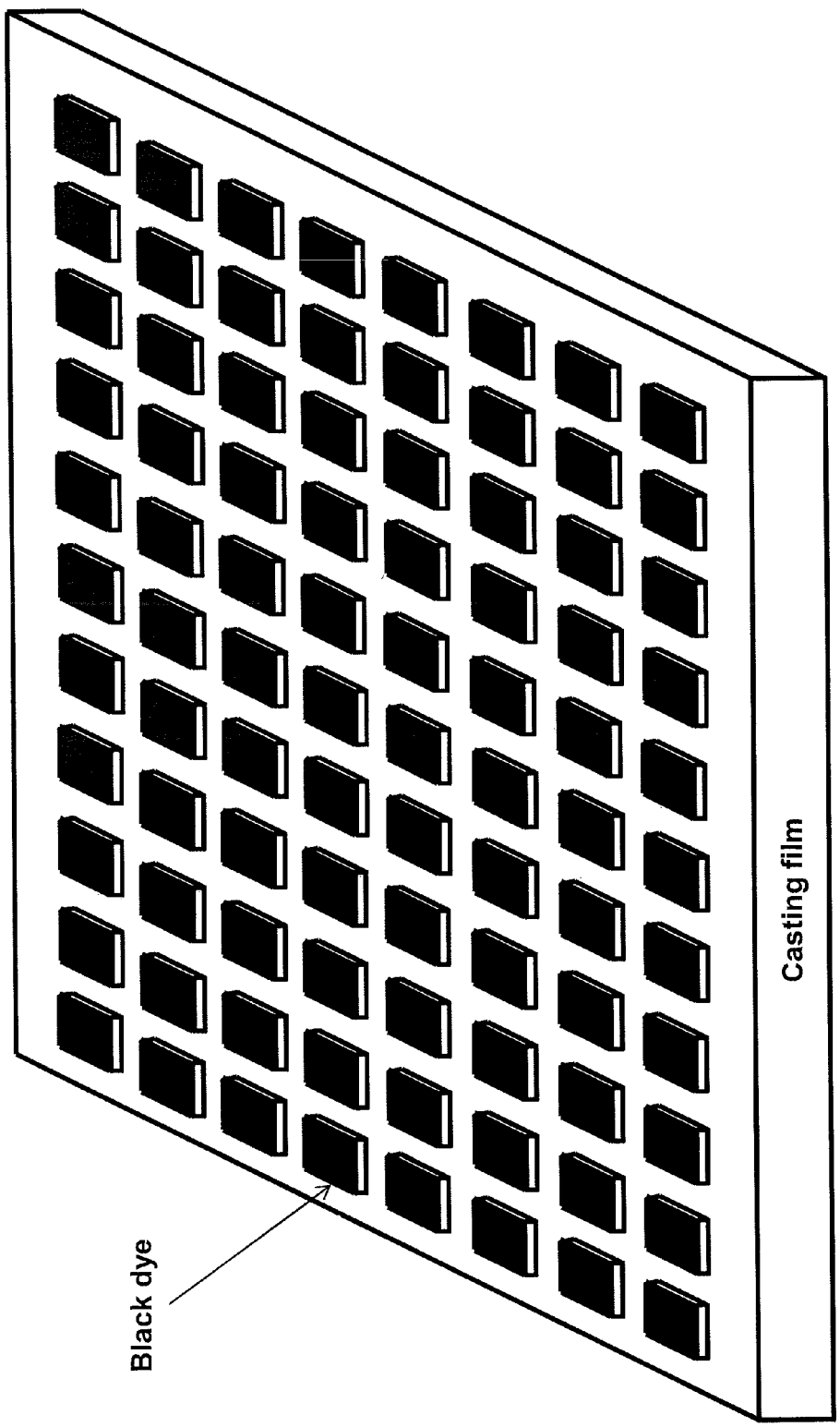
Figure 15. A dotted coloration by printing method

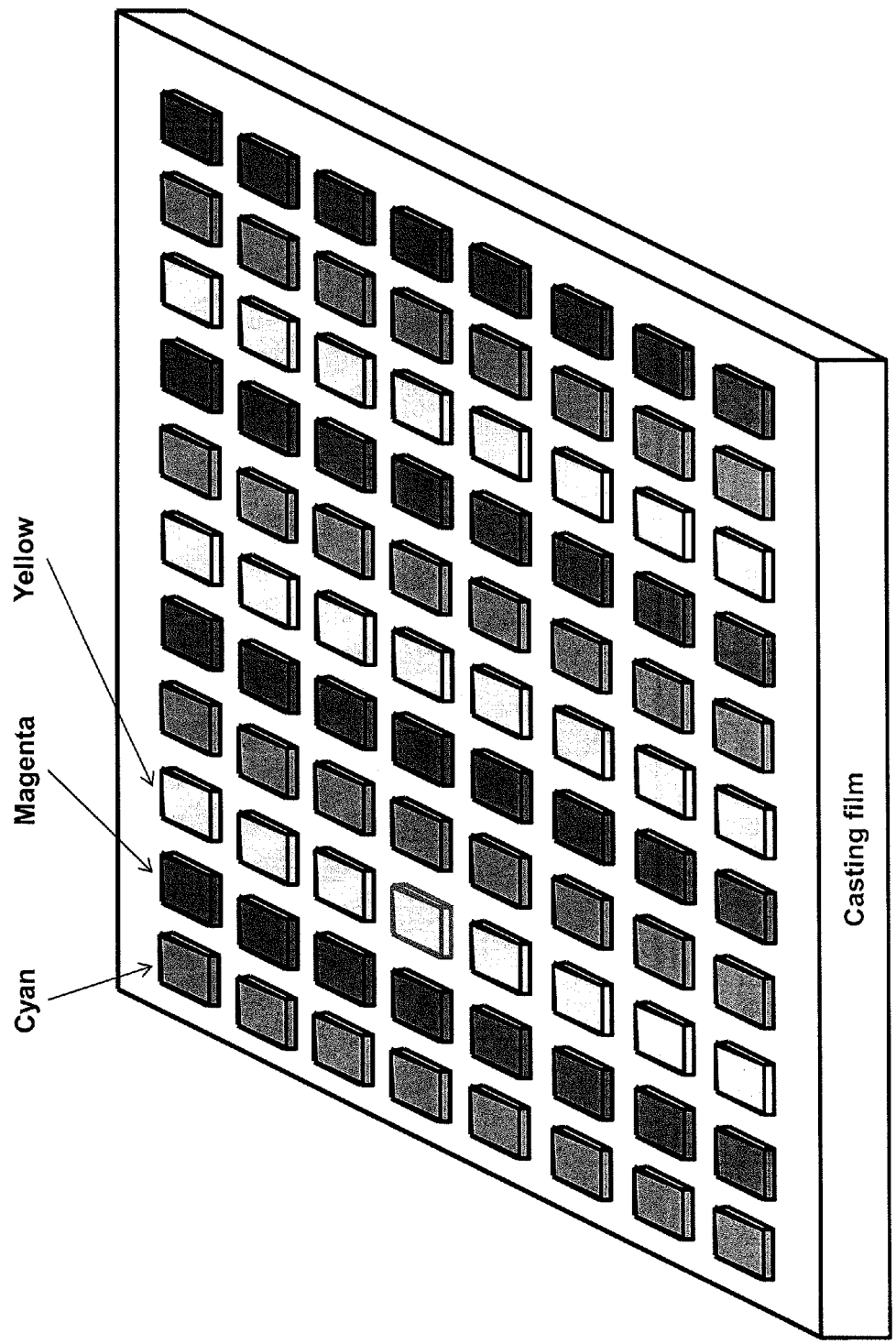
Figure 16. A three primary color dotted printing

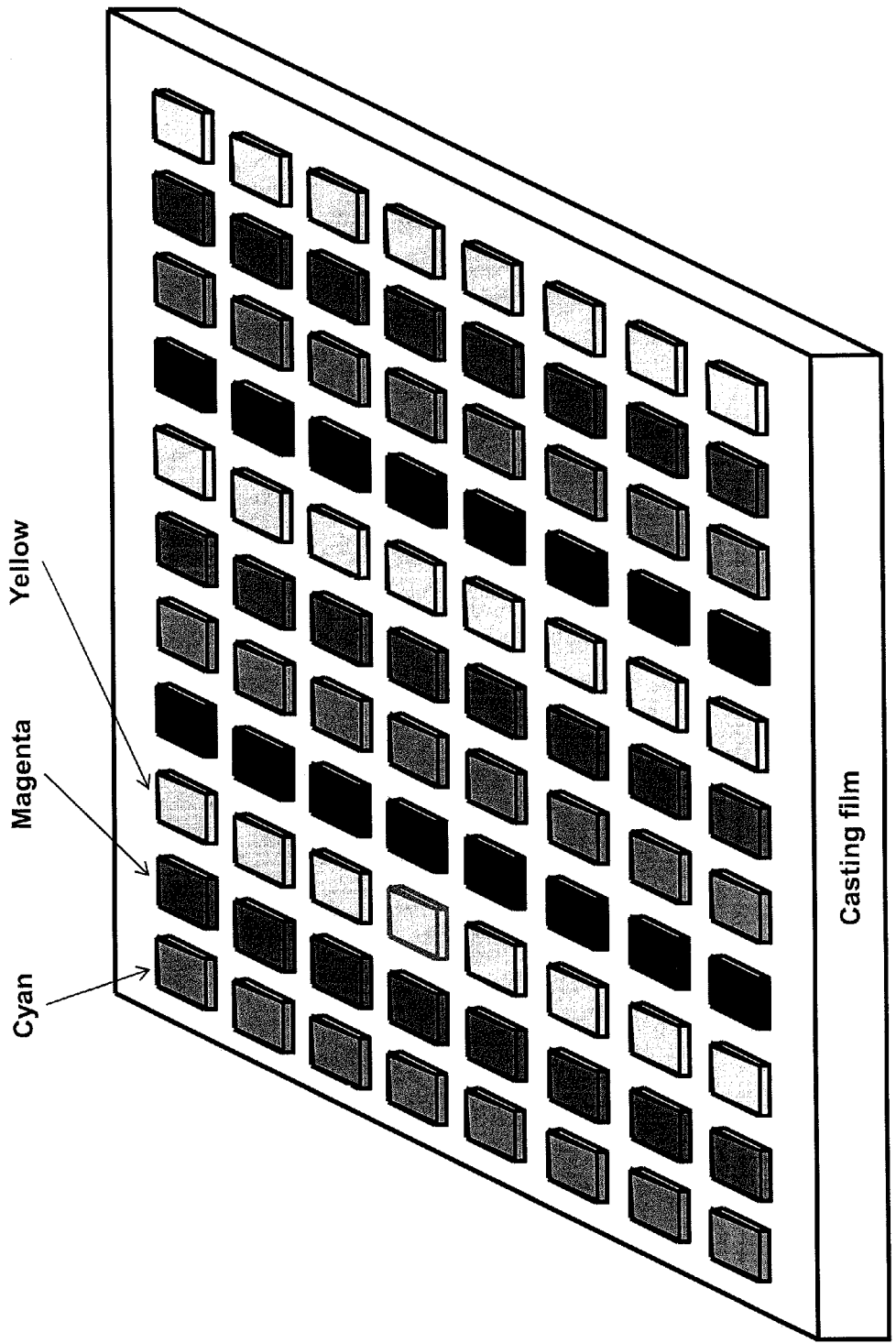
Figure 17. Three primary color and black dots printing

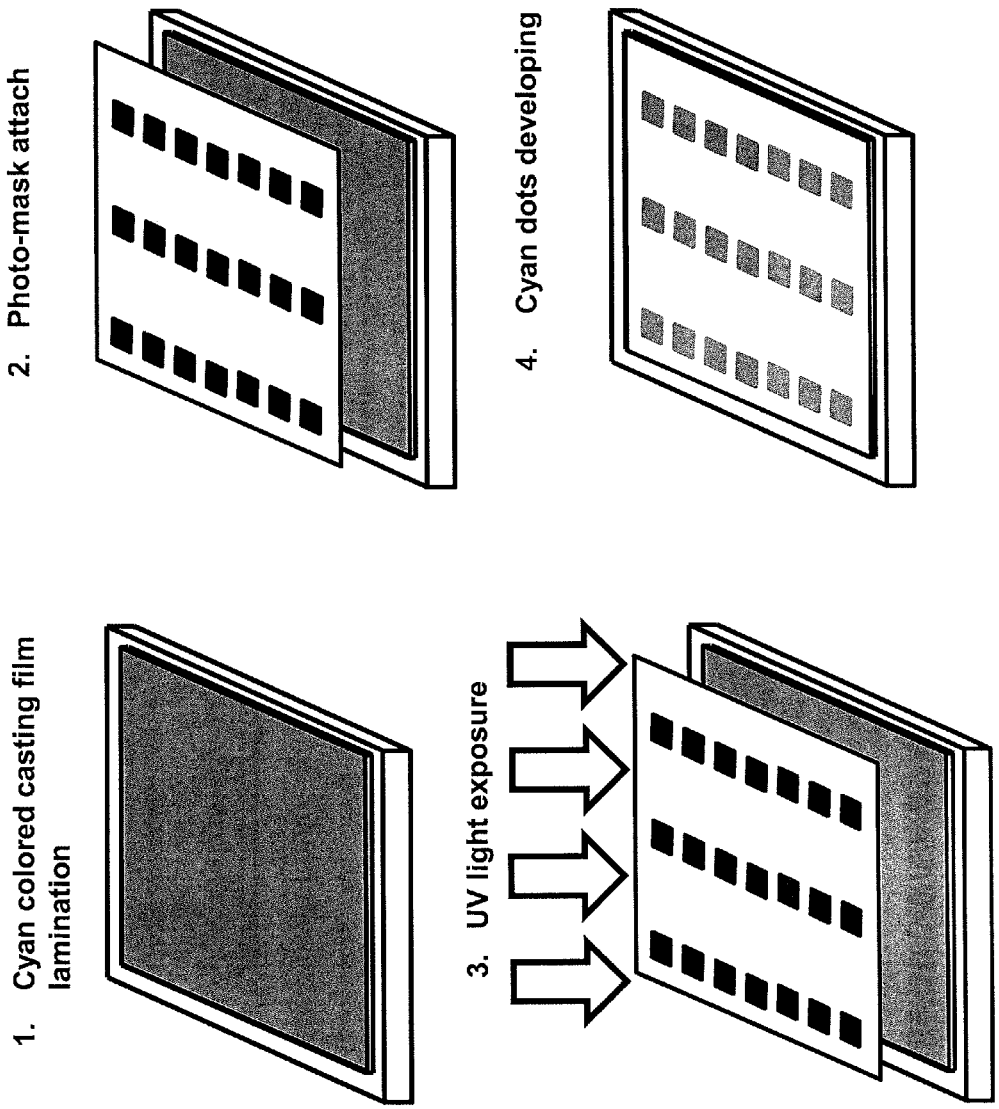
Figure 18. A colored switching element preparation by photo lithography
1. Cyan colored casting film lamination
2. Photo-mask attach
3. UV light exposure
4. Cyan dots developing

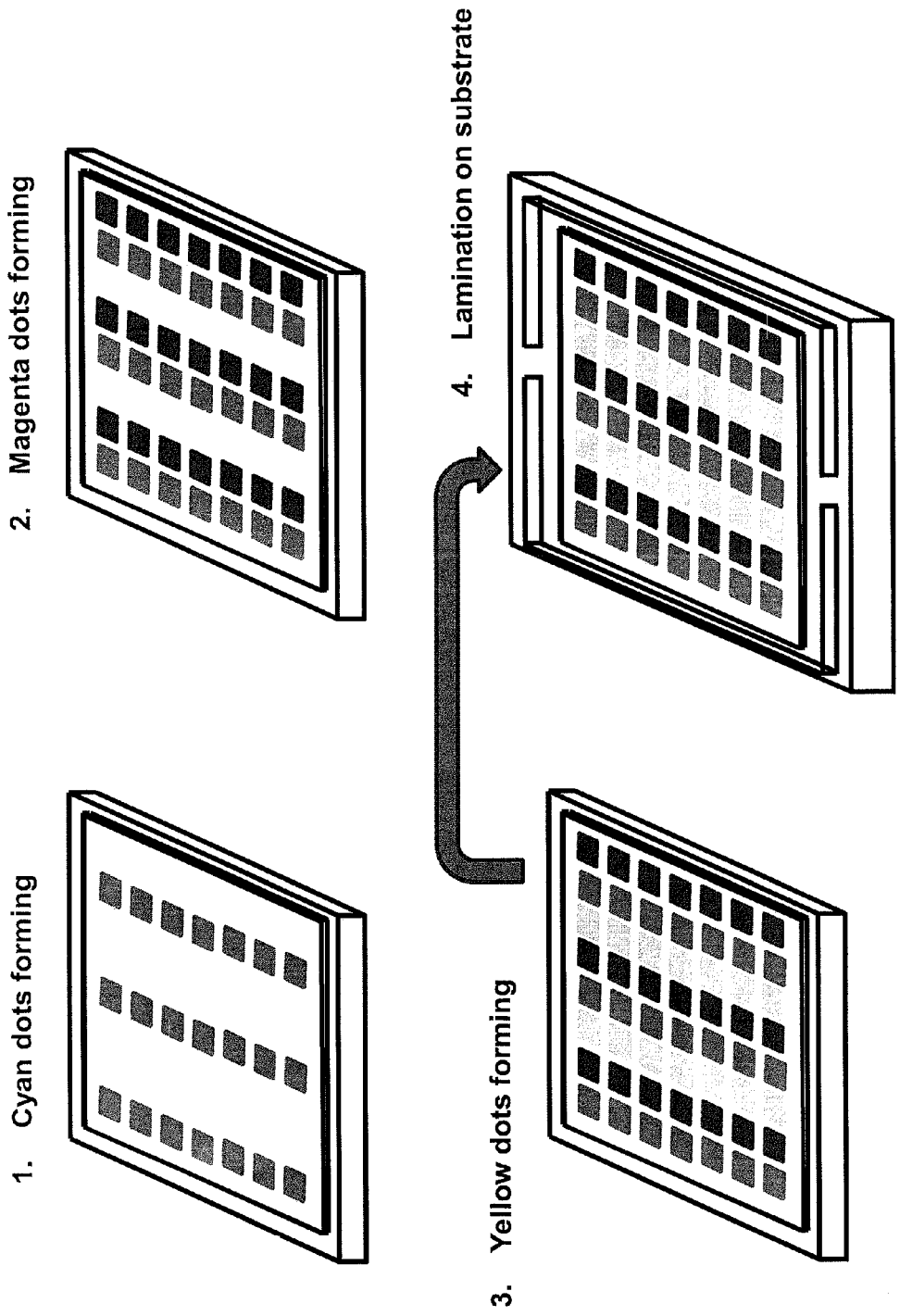
Figure 19. Primary color switching element preparation by duplicated photo lithography
1. Cyan dots forming
2. Magenta dots forming
3. Yellow dots forming
4. Lamination on substrate

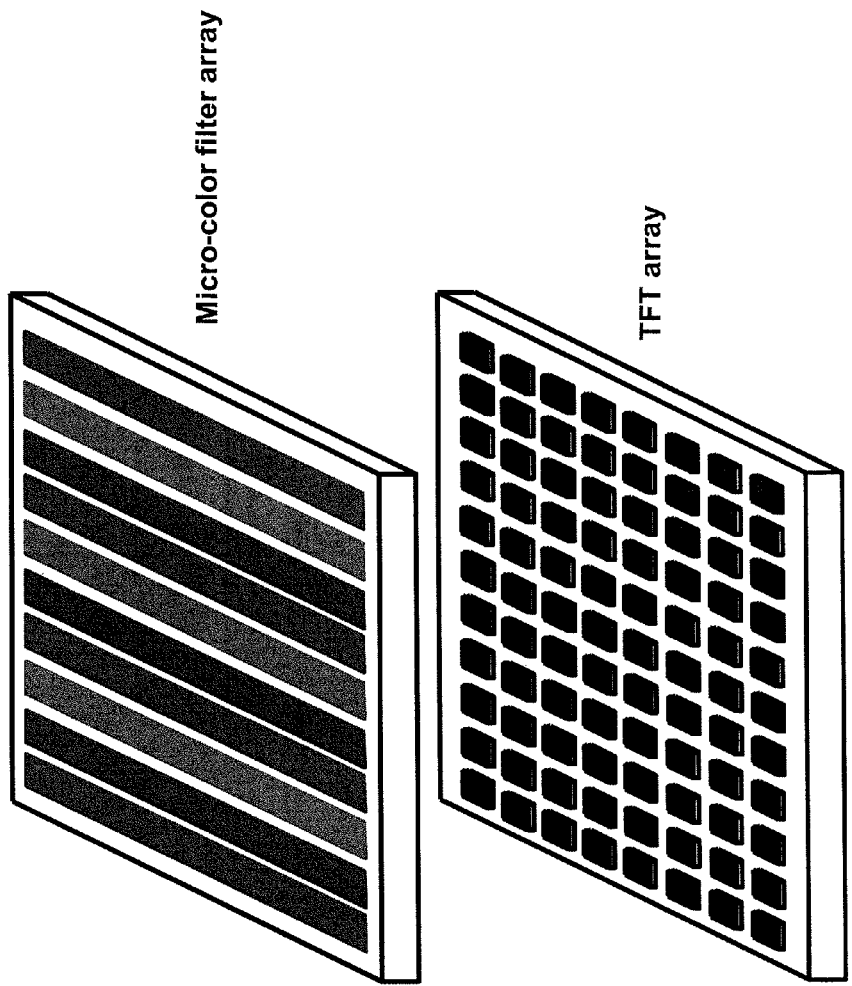
Figure 20. An example of state-of-art transparent use model of the Electrophoretic display configuration

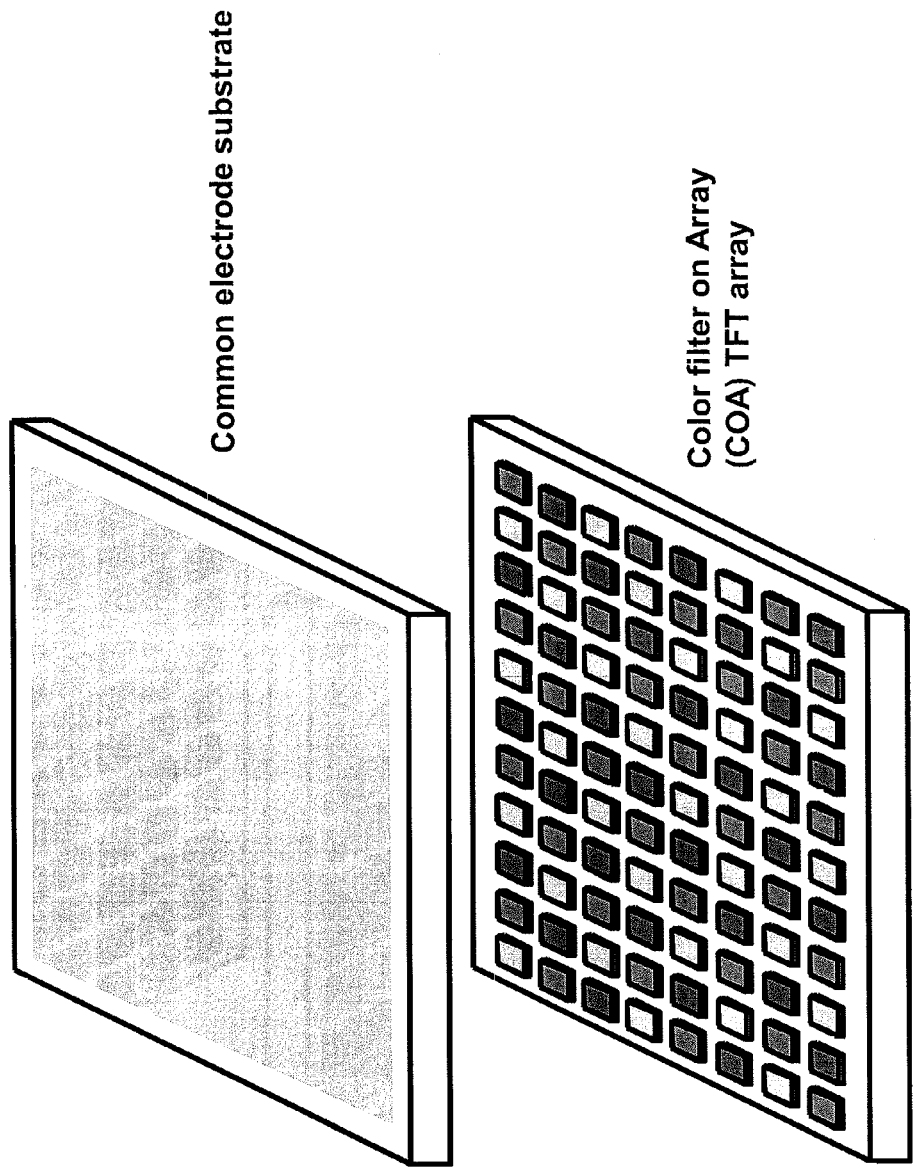
Figure 21. Reflective display configuration mode with Color Filter on Array (COA) technology

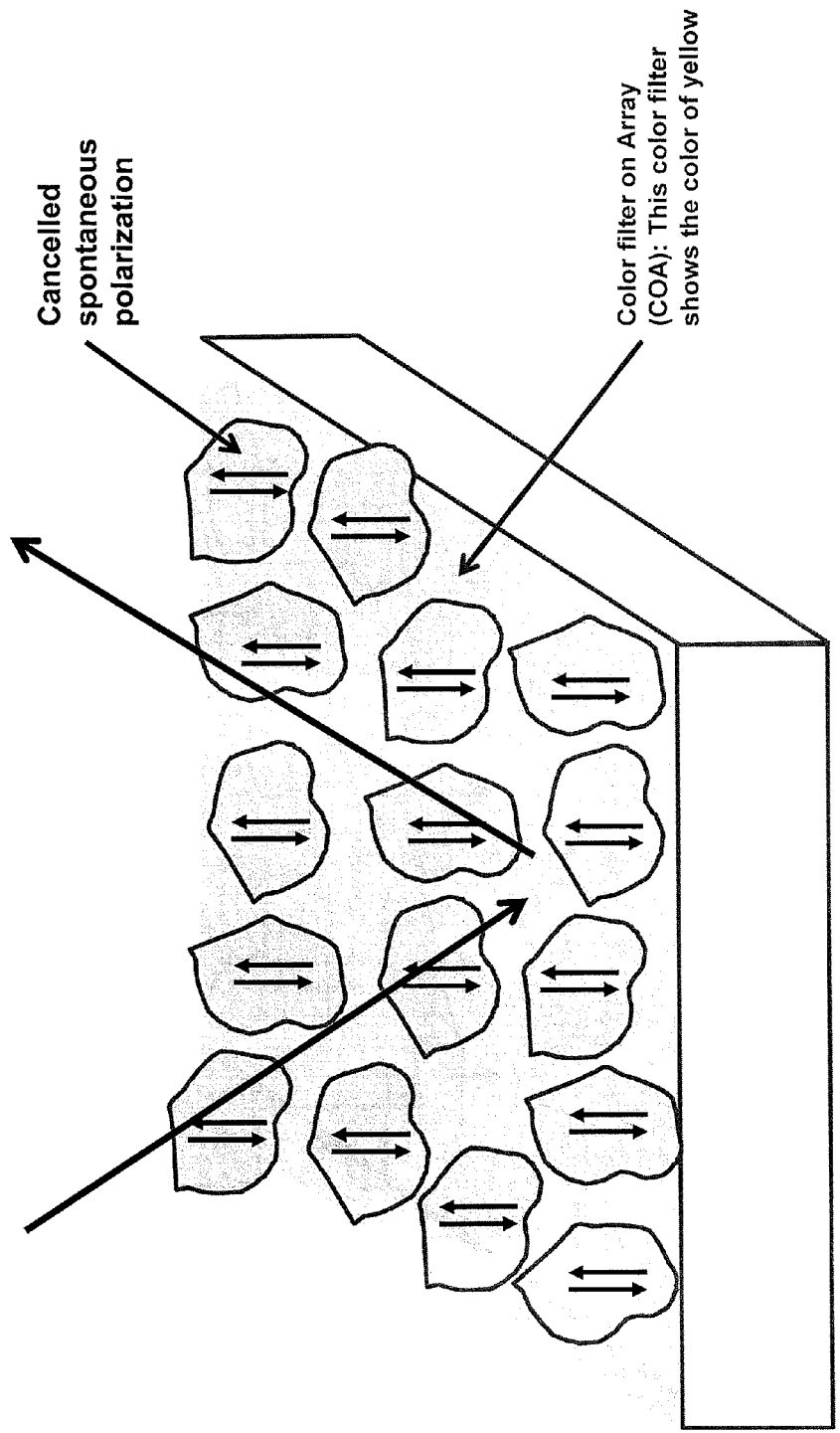
Figure 22. Anti-ferroelectricity function to display specific color in conjunction with elimination of spontaneous polarization

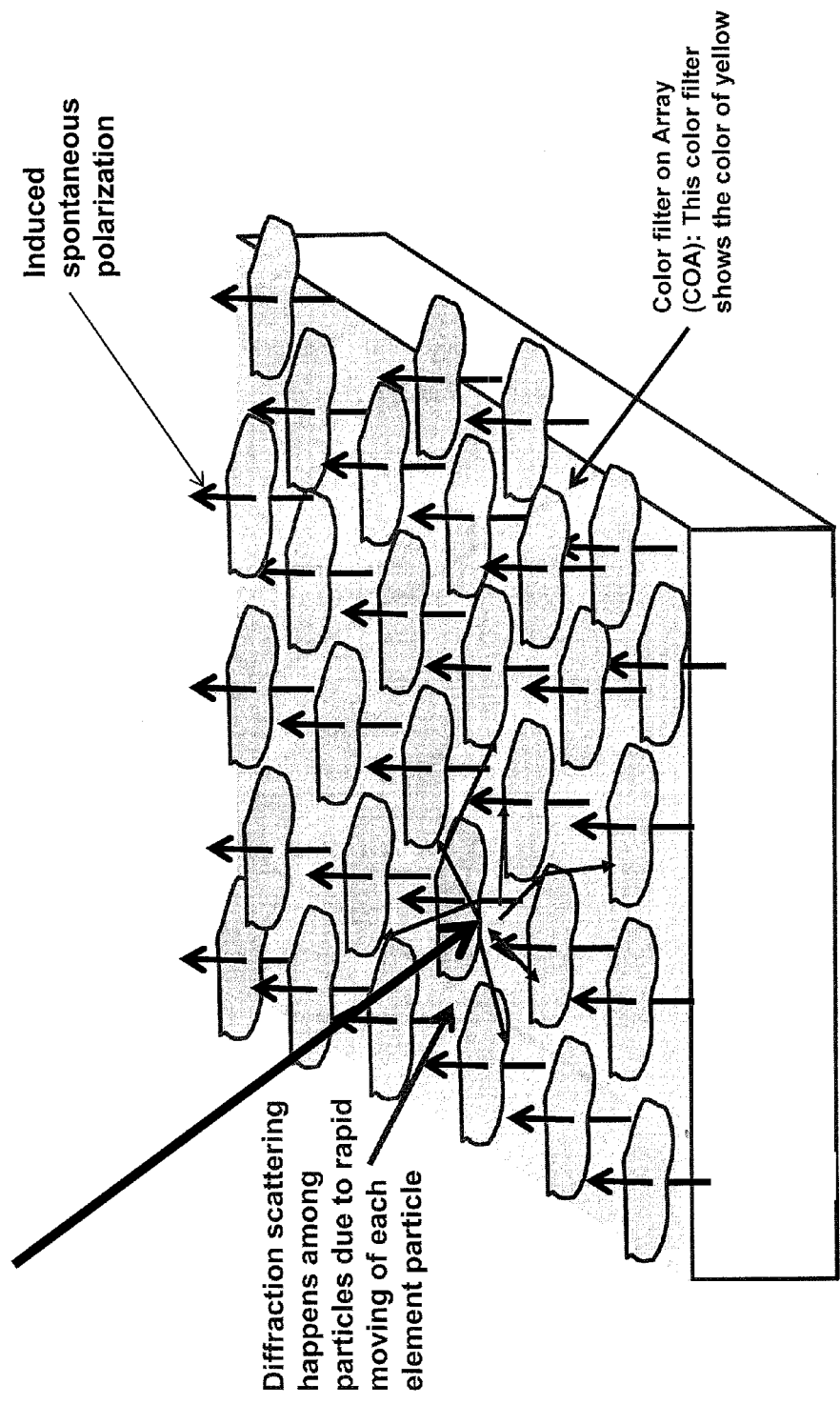
Figure 23. Color image reproduction with induced spontaneous polarization in conjunction with COA array

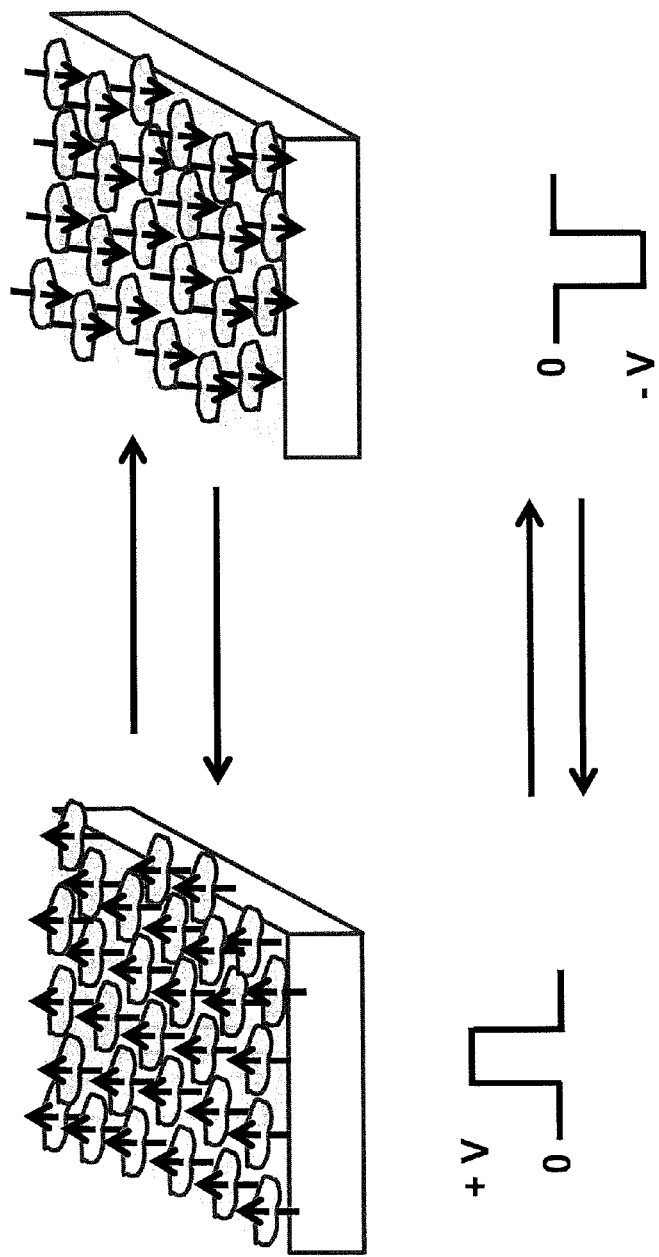
Figure 23-a. Color image reproduction with induced spontaneous polarization in conjunction with COA array by diffraction light scattering Figure 23-b. Giving spontaneous polarization to potentially ferroelectric/Anti-ferroelectric particles
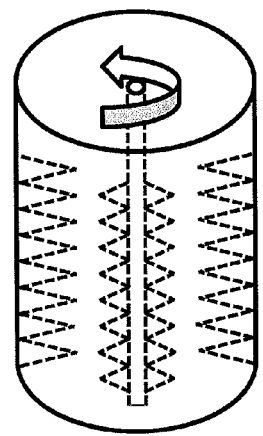
Figure 23-b (2)
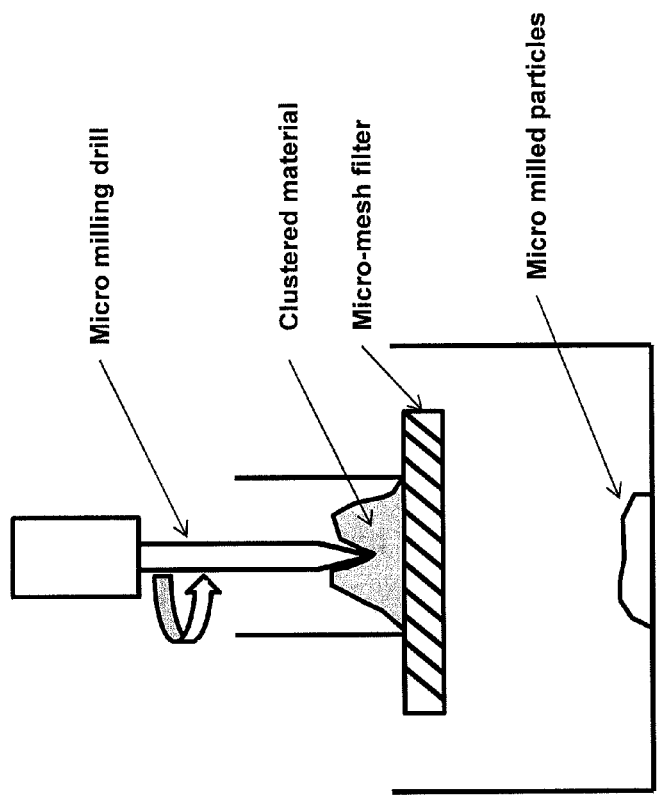
Figure 23-b (1)

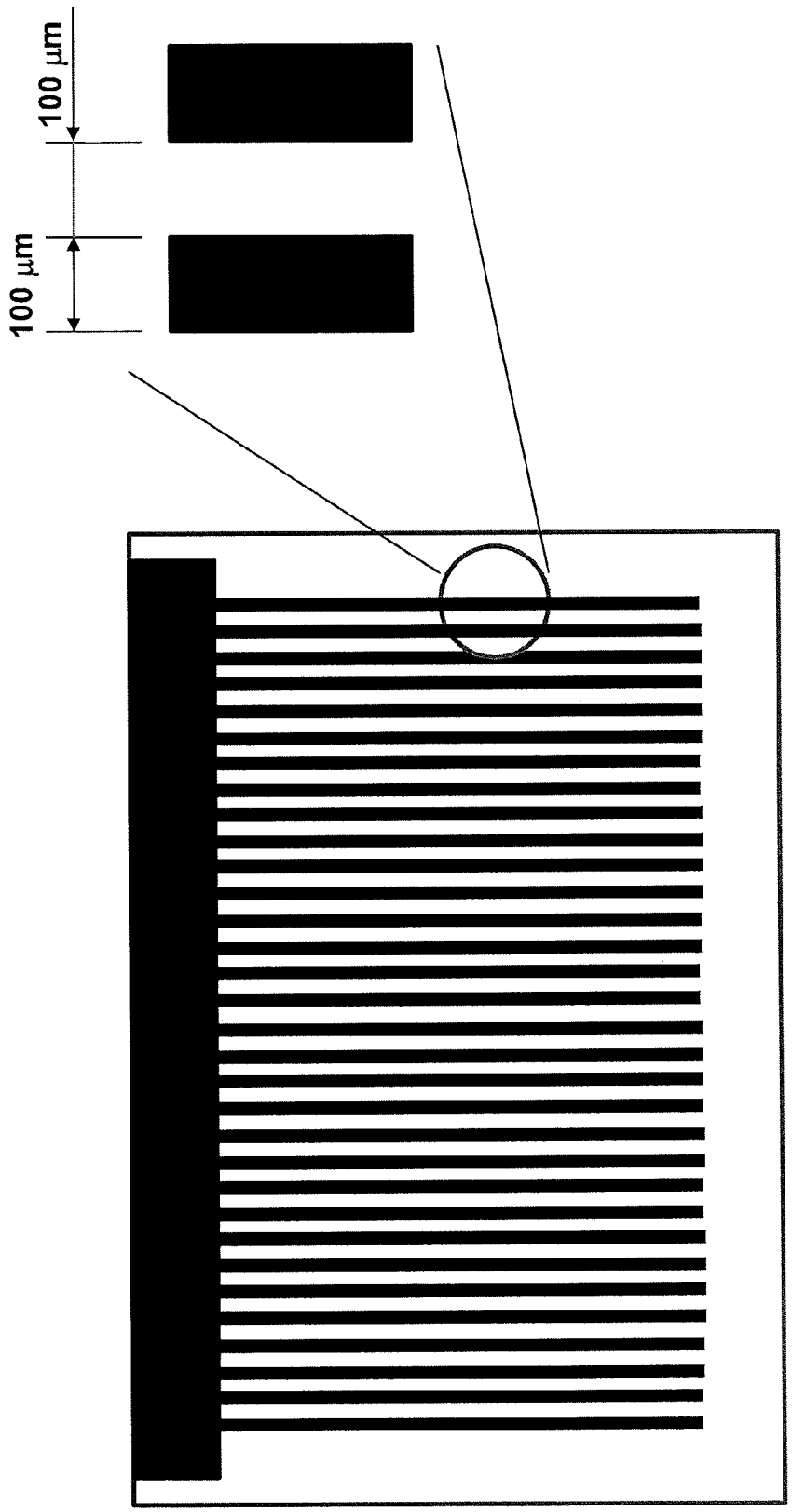
Figure 24. ITO pattern with 100 μm line and space

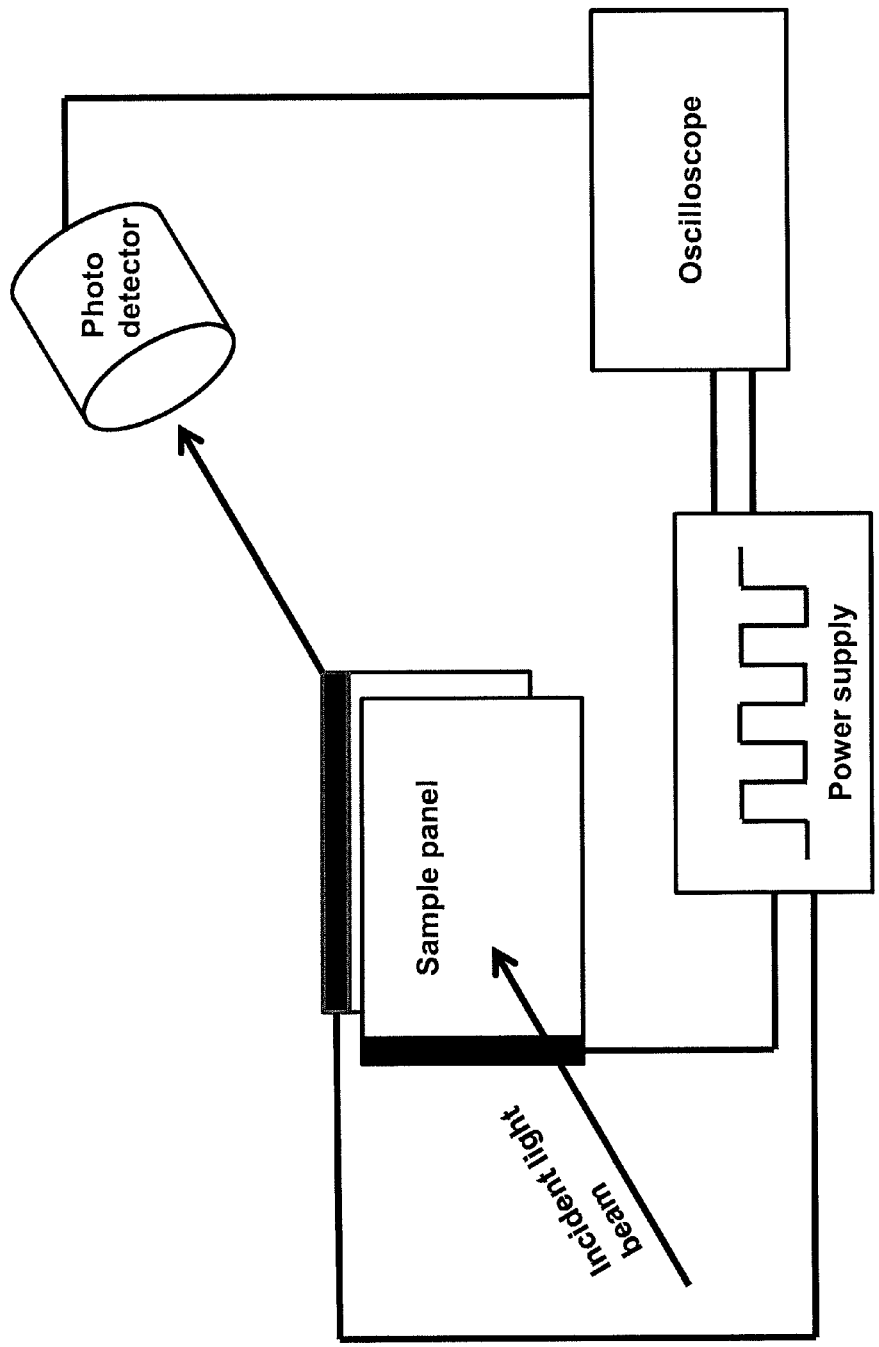
Figure 25. Electro-optic response measurement set-up

FINE PIXEL PITCH ELECTROPHORETIC DISPLAY

BACKGROUND OF THE INVENTION

1. Field of the Invention

The invention relates to electrophoretic displays, in particular its electro-optic switching particles preparation method and the devices made by the method.

2. Background of the Relevant Art

An electrophoretic display has benefits in terms of several information display application fields such as sun light readability, power saving nature with its display image memory function with display medium itself, wide viewing angles, and good compatibility with current available display system both in terms of display image signal sources and interfaces.

On the other hand, current known electrophoretic display technologies have some downside in terms of competitiveness against current commercially available flat panel display technologies. One of the drawbacks is inconsistency of memory type and full motion video image capability in terms of drivability of the display media. Since, display media's image memory effect is very effective to save power, on the other hand, full motion video images require continuous rewriting of the screen, and display media's image memory effect is even obstacle function for the continuous rewriting. In principle, display media's image memory function is avoidable function for full motion video image reproduction. As long as continuous and consecutive rewriting is required, display media's power saving with its memory effect does not have contribution to power saving at all. Moreover, refreshing scheme of the stored image requires both more power and writing time, resulting in inconsistency between power saving and full motion video image capability.

The other drawback is somehow limited display resolution of current available electrophoretic display system. There are several reasons why current known electrophoretic display systems have some limitation in their image resolution, specifically for color image reproduction. Detail of this particular technical limitation will be discussed below. In spite of above beautiful performance of electrophoretic display systems, above inferior issues compared to current commercially available flat panel display technologies have made limitation of electrophoretic based display technologies in terms of penetration or creation of their market.

Therefore, it is highly expected for an electrophoretic display technology to eliminate any drawbacks that are not seen in current commercially available flat panel display system, and to keep the beautiful nature of electrophoretic display technologies such as sun light readability, a paper like image readability, consistent power saving capability in general display environment, and so on.

Current available electrophoretic display technologies and/or current known electrophoretic display technologies are featuring their display media's own image memory capability. A display medium's own image memory capability is very beneficial with display module power saving. Not only ambient light reflection basis of the display technology, but also no need of continuous and sequential image refreshing provides significant power saving. A display medium's own image memory function is also very good to provide very stable and firm image to a viewer. Unlike continuous refreshing type of screens which are current most of flat panel displays use including CRTs (Cathode ray Tubes), LCDs (Liquid crystal Displays), OLEDs (organic Light Emitted Diodes), memorized completely still image provides very stable and non-jittering images just same with paper based images.

In spite of a great benefit of stable and very soft image for human eyes of memorized image on an electrophoretic display, display medium's image memory function significantly restricts a motion video image capability regardless optical switching response speed of a switching particle of the electrophoretic display. Current widely being used flat panel display technologies described above do not have display media's own image memory effect. This means, once changed optical state by externally applied stimulation such as electric field application, goes back to the previous state before the external stimulation was applied immediately after the external stimulation is removed. Therefore, it is required to continuous pumping with so-called refreshing excitation to keep the image regardless still images and motion video images for such display technologies. Although these display technologies require continuous refreshing which consumes a certain power, automatic return to the original or initial optical state can eliminate any "re-set" driving scheme. Without "re-set" driving scheme, in particular a large display information content screen case, it helps writing up time of whole screen significantly shorter. Without "re-set" driving scheme, even display medium's optical switching time is relatively longer such as 100 ms; it is possible to have some level of motion image with some image artifacts such as non-crisp motion video image. On the other hand, even an optical switching display medium's switching time is very fast such as 10 ms, if it requires "re-set" driving scheme, actual full screen writing time is far longer than required motion video image reproduction. Therefore, in order to have a full motion video capable electrophoretic display without sacrificing significant power saving for still image application, both having a display medium's display image memory capability for still image purpose, and non-display medium's display image memory capability for motion video image are necessary. None of current known electrophoretic display technologies provide such duplicated technical capabilities, therefore, it is highly expected to realize these somewhat inconsistent performances to eliminate drawback that is not seen in current major flat panel display technologies.

As one of very intrinsic natures of electrophoretic display technologies, their display resolution is dependent optical switching particle size. In order to have good enough light scattering performance which is very important for paper like display image, the optical switching particle size must satisfy mu-light scattering that means the particle size must be large enough compared to visible light wavelength (normally it is about 0.6 micron). On the other hand, if the particle size is too large such as over 10 micron, the display resolution has significant limitation to avoid parallax issue as a display device. As FIG. 1 illustrates, if switching particle size is say 30 micron, and the display image pixel pitch is 30 micron, the display panel gap (the definition of the panel gap is the layer thickness of display medium sandwiched by two electrodes substrates) should be over 30 micron in order to secure switching particles well enough movement in a limited space. In actual display panel, due to surface topography and panel manufacturing process tolerance requirement, the required panel gap is most likely over 40 micron. In this case, as FIG. 1 illustrates, some of incident light from ambient light condition is scattered next pixel area's optical switching particles, resulting in wrong pixel image. In order to avoid this parallax problem, if the switching particle size is 30 micron, pixel pitch should be over double of panel gap. This condition requests pixel pitch of over 80 micron with panel gap of 40 micron. Based on current most popular color display reproduction means that is use of micro-color filters, sub-pixel corresponding to each primary color sub-pixel size should be larger than 80 micron. As is well known with reflective subtract color system, in order to have well enough light reflectivity, not only subtract primary colors of cyan, magenta, and yellow, white sub-pixel, and sometime, even black sub-pixel are implemented. Based on this sub-pixel primary color filter method, single full-pixel size must have over 320 micron or even 400 micron pitch. This image resolution pitch is far larger than current printed image or even current mobile application LCDs cases.

When an optical switching particle size is small enough, for example smaller than 5 micron, this particle size would be well enough to keep light scattering with visible wavelength. In such smaller optical switching particle cases, in order to have multi-color or full-color display systems, following three ways are currently known.

(1) Primary colored multiple particles
(2) Micro color filters with small sized black and white particles
(3) Primary colored separated particles For the case (1), each primary colored switching particle such as cyan, magenta, and yellow colored particles have different threshold voltage to respond externally applied electric field, and different threshold selectively drive each colored particle in a panel, resulting in reproducing multi-color image with good enough display resolution such as smaller than 20 micron pixel pitch. This case is introduced by Naoki Hiji, et. al., "Novel Color Electrophoretic E-Paper Using Independently Movable Colored particles" paper number 8.4, SID 2012 Digest page 85 to 87 (2012) in Boston. This method effectively realize multi-color and/or full-color electrophoretic display image with fine enough pixel resolution. However, this method requires each colored particle's display image memory effect and at least three duplicated driving scheme to differentiate each primary colored particle's selective driving. This driving scheme significantly limits total screen writing time, resulting in significant difficulty of full motion video image capability regardless each particle's switching time. In short, this particular method is very effective to have a fine enough pixel pitch, on the other hand, this method significantly restricts full motion video image reproduction capability. Therefore, this method still keeps significant drawback to compete with current available flat panel display technologies.

For the case (2), as long as small enough size of switching particles have fast enough optical switching as well as no particular display image memory function at the display image, in conjunction with micro color filters that is very popular and widely used for current most of flat panel display technologies, it works to provide fine enough image with multi-color and/or full color image reproduction with full motion video reproduction. However, this method has significant technical difficulty in manufacturing. Even 30 micron sub-pixel pitch micro-color filter fabrication is nowadays very popular manufacturing. This means it is well enough conceivable as a volume manufacturing product. On the other hand, a micro color filter method has a general liability in terms of limited light reflectivity due to its nature of light absorption. In order to maximize light reflectivity, a back-side on color filter configuration illustrated in FIG. 2 is normally applied. This configuration also requires a transparent electrode formation under the micro color filter as shown in FIG. 2 in order to avoid surface reflection of transparent electrode which significantly degrades color purity of reflected light. Since a transparent electrode such as ITO (substantially, it consists of Indium Oxide) has very high reflective index such as over 3.0, then, if color filter is formed under the Ito electrode, most of incident light is reflected on the surface of ITO, and could not reach at color filter, resulting in very poor color purity. Therefore, this system needs to form color filter on the ITO. Each color filter includes each color pigment, and each pigment contained color filter works as a different dielectric layer under the two parallel electrodes. Due to nature of electrophoretic displays, each different dielectric layer stacked pixel including switching particles layer provides different threshold to each color pixel switching particles. This variation of threshold voltage makes gray scale control significantly difficult, or even taking into account temperature dependence of dielectric characteristics, it is almost impossible to control gray scale by threshold voltage means.

For case (3), as long as each colored switching particle is prepared small enough size, in principle, it is fine to provide fine enough pixel pitch. However, as a display panel preparation, this method requires clear separation of each colored switching particles depending on each pixel. If the display medium consists of fluid or liquid shape, only conceivable way to avoid color mixing is physical separation of each colored pixel. In this case, due to requirement of physical separators at each color sub-pixel, significant area on the screen is sacrificed in terms of aperture ratio. Significant reduction of aperture ratio results in significant reduction of reflectivity on the display screen. Film type of display medium or self-sustained display medium may avoid necessity of physical separator on the display substrate. However, in this case, very fine pitch patterned each primary colored particles are formed in the self-sustained display medium in the scale rang of micron scale. Under the consideration of film medium's size accuracy, micron scale of distance accuracy may not be easy. Even the film is prepared with very accurate manner, at the panel fabrication process, more or less; two substrates give some mechanical pressure to the "soft" self-sustained display medium, resulting in change of accurately aligned particles in the film.

As discussed above, current known technologies have significant technical challenges in terms of providing practically fine enough pixel image that is already established as volume manufacturing technology in LCDs, OLEDs and so on. Therefore, new electrophoretic displays are doomed to provide fine enough pixel pitch as well as well enough controllable multi-color, and/or full color full motion video images.

SUMMARY OF THE INVENTION

This invention has been thought out to eliminate current electrophoretic displays drawbacks compared to current widely used other types of display technologies. One is compatible function between display medium's memory effect and non-memory function in order to have effective characteristic properties between power saving still image and full motion video image reproduction. The other is a practical availability of fine pixel pitch such as less than 50 micron pixel pitch to compete with current available flat panel display technologies.

In order to provide practical means to solve above two major technical issues in an electrophoretic display technology, a non-display medium memory effect driving torque to the display switching particles and specific display medium fabrication process are introduced.

Although non-display medium memory effect is intrinsic requirement to enable the electrophoretic display having full motion video image, when the display image is a still image such as just character images, the image must be displayed with the minimum power without necessity of refreshing at each display frame. In order to have compatible performance between power saving still image reproduction and smooth and crisp enough full motion video image reproduction, some sort of "static RAM" similar driving method is introduced in this invention. In order to realize somewhat inconsistent requirement both at still image and full motion image reproductions, this invention introduces anti-ferroelectric driving torque to the switching particles in a proper sustaining display media. The specific and intrinsic performance of anti-ferroelectric switching particle is absence of spontaneous polarization or cancellation of spontaneous polarization when less than threshold voltage is applied to the display medium, and when over the threshold voltage is applied, the display medium shows large enough spontaneous polarization. At a still image display mode, after the whole screen was written, a holding static voltage is applied to the whole screen, and as long as the static voltage is applied, the still image is being kept on the screen as non-disturbed or same image like written on a paper. As long as driver controller has no need to create refreshing data, all of logic portion of power is being kept as sleeping mode, and then the only static voltage application can minimize the total power consumption. This power saving with just static voltage application is more effective with larger panel or higher information contents displays.

In order to have practically effective fine pixel pitch electrophoretic displays, a photo-reactive resin sustained anti-ferroelectric switching particles has been thought out in this invention. Introduction of anti-ferroelectric drive torque particles in an electrophoretic display also enables above effective compatible display media between static image and full motion video image as described above. The effective fine pitch color electrophoretic displays are realized by specific photo-lithography means in conjunction with the self-aligned fine pitch patterned process with proper materials preparation as described detail below. With well-established fine pixel pitch photo-lithography process in current established flat panel display industry with newly invented materials and process, this invention is very practical and durable with volume manufacturing in reasonable manufacturing cost.

Using so-called nano scale of anti-ferroelectric particles consisting of dislocation type of ceramic based materials in conjunction with optically transparent (to the visible light wavelength) UV reactive resin such as PMMA (Poly Methyl Meta acrylate), a fine pixel pitch electrophoretic display panel is effectively prepared with current established flat panel display manufacturing technologies. A dislocation type of anti-ferroelectric particles provide both memory effect under static voltage application for static image display, and fast enough full motion video image reproduction with consecutive refreshing of each frame signals.

BRIEF DESCRIPTION OF THE DRAWINGS

FIG. 1 shows the parallax issue due to thick panel gap;

FIG. 2 shows a structure of FOP (Filter on Pixel);

FIG. 3(a) shows general electro-optic property of anti-ferroelectric switching;

FIG. 3(b) shows memory type of writing scheme in general;

FIG. 4 shows general driving scheme for refreshing writing;

FIG. 5(a) shows an electro-optic property of ferroelectric switching;

FIG. 5(b) shows a display duty ratio of ferroelectric base switching;

FIG. 6(a) shows an electro-optic property of anti-ferroelectric switching;

FIG. 6(b) shows a display duty ratio of anti-ferroelectric base switching;

FIG. 7 shows a difference in frame writing scheme between memory type and refreshing type;

FIG. 8 shows an overall process flow of fine pitch spontaneous polarization based electrophoretic switching media preparation;

FIG. 9 shows a spontaneous polarization based switching casting film preparation process;

FIG. 10 shows a casting film case equipped with electro-poling electrodes;

FIG. 11 shows a half-cured perimeter seal pattern;

FIG. 12 shows a patterning method of casting film with UV lithography;

FIG. 13 shows a self-alignment patterning method;

FIG. 14 shows coloration by printing method;

FIG. 15 shows a dotted coloration by printing method;

FIG. 16 shows a three-primary color dotted printing;

FIG. 17 shows a three-primary color and black dots printing;

FIG. 18 shows a colored switching element preparation by photolithography;

FIG. 19 shows primary-color switching element preparation by duplicated photo lithography;

FIG. 20 shows an example of state-of-art transparent use model of the Electrophoretic display configuration;

FIG. 21 shows a reflective display configuration mode with Color Filter on Array (COA) technology;

FIG. 22 shows anti-ferroelectricity function to display specific color in conjunction with elimination of spontaneous polarization;

FIGS. 23 and 23-a show color image reproduction with induced spontaneous polarization in conjunction with COA array by diffraction light scattering;

FIG. 23-b shows generation of spontaneous polarization to potentially ferroelectric/anti-ferroelectric particles;

FIG. 24 shows an ITO pattern with 100 mm line and space; and

FIG. 25 shows an electro-optic response measurement set-up.

DETAILED DESCRIPTION OF THE INVENTION

As discussed, in an electrophoretic display, there are two closely related technical challenges to overcome: one is an effective compatible display mode enabling power saving at still image display and crisp full motion video image without display medium memory effect, and the other is fine enough pixel pitch without any manufacturing burden in terms of current established flat panel display volume manufacturability.

The inventors of this invention proposed ferroelectric driving torque electrophoretic display technology in U.S. patent application Ser. No. 13/337,551. As the patent application described in detail, the ferroelectric coupling driving torque enables an electrophoretic display full motion video image capability with keeping sun light readable electrophoretic specific upside performance. Based on the ferroelectric coupling torque, however, taking into account power saving characteristics in still image display, this invention introduced new concept in terms of driving coupling torque. As described in the patent application, the inventors has introduced effective driving coupling torque between ferroelectric particles and externally applied electric field as follows. See also U.S. patent application Ser. No. 13/349,489. The two patent applications are incorporated herein by reference in their entireties.

The inventors reached at entirely different driving torque sources for dispersed particles in an electrophoresis system.

Electric by-layer is more or less shields polarization induced on the surface of dispersed particles. In particular this polarization shielding effect is also going stronger by stronger applied electric field strength. This particular effect also degrades expected increase effect of electric field strength. By introducing ferroelectric coupling, this degradation effect is minimized, more over actual working coupling torque with applied electric field strength is much stronger than those provided by dielectric material. A ferroelectric material has spontaneous polarization, and the spontaneous polarization can switch by externally applied electric field. By introducing ferroelectric material based dispersed particles in an electrophoretic system, an effective torque equation is shown as Equation 1 with ferroelectric particles;

$$v = E(\in_{\mathit{eff}} \in_0 \xi)/\eta + E(P_s \xi)/\eta_f \qquad \text{Eq. 1}$$

Here, $P_s$ is spontaneous polarization of the ferroelectric particle, $\square_f$ is substantial working dynamic viscosity to ferroelectric particles. In Equation 1, ferroelectric coupling base dispersed particles have following relationship between two contributing terms of mobility.

$$E(\in_{\mathit{eff}} \in_0 \xi)/\eta + E(P_s \xi)/\eta_f \qquad \text{Eq. 2}$$

The application has provided effectively strong driving torque of the switching particles in an electrophoretic display. This invention, however, introduces further new concept in terms of driving coupling torque in order to have power saving and full motion video image capability depending on display mode.

As the required performance at still image display for significant power saving, display medium including switching particles needs to have memory effect as the display medium. In order to satisfy this requirement, when the written image is kept as a still image, the display medium has to have spontaneous polarization to keep written optical status as they are. As long as the written image has no need to rewrite, an electronics portion, specifically at logic circuit whose power consumption is relatively large for refreshing the screen image, does not need to keep working. Unlike ferroelectric materials, anti-ferroelectric material does not show spontaneous polarization under absence of externally applied electric field condition. On the other hand, once, an anti-ferroelectric material is located in a sufficient power of externally applied electric field, the anti-ferroelectric material shows spontaneous polarization. Once, an anti-ferroelectric material shows its spontaneous polarization, the behavior of the material is the same as that of ferroelectric material. Therefore, the spontaneous polarization showing anti-ferroelectric material's behavior is the same as that of ferroelectric material. After the whole screen was written and still image was formed in a screen using anti-ferroelectric materials based electrophoretic display medium, then, a static supporting voltage is applied to the whole screen, the written still image is held with the minimum power as shown in FIG. 3 (b) of this concept. When the display is used as full motion video image, the screen shows full color full motion video image by changing applied voltage at specific pixel for each frame such as 120 Hz of screen frame rate as shown its concept in FIG. 4. The full motion video image formation is based on ferroelectric driving coupling torque with anti-ferroelectric switching particles. When well enough strength of externally applied electric field to an anti-ferroelectric material, the anti-ferroelectric material shows spontaneous polarization and some sort of induced spontaneous polarization by externally applied voltage works as the same as that of spontaneous polarization in a ferroelectric material. The intrinsic difference in terms of electro-optic effect of spontaneous polarization between that of ferroelectric and anti-ferroelectric materials is a duty ratio or effective light throughput during full motion video image reproduction, or continuous refreshing image reproduction as shown in FIG. 5. FIG. 5 shows intrinsic difference in an electro-optic performance between ferroelectric coupling and anti-ferroelectric coupling torque. As shown in FIG. 5 (a), ferroelectric coupling torque works as a flip-flop, in other words, upward or downward of spontaneous polarization direction against the sandwiched pair of electrodes. At anti-ferroelectric coupling torque, it has three primary stable states: one is upward, one is downward, and the third state is cancellation or no spontaneous polarization state. Theoretically, these two differences do not provide substantial difference in electro-optic performance for still image display, or non-refreshing image creation. On the other hand, with refreshing type of image display case, the anti-ferroelectric based spontaneous polarization nature that does not keep spontaneous polarization by removing applied voltage works as non-memory type of display. Because of disappearing spontaneous polarization as soon as applied voltage is removed makes the initial optical state without any action other than removing applied voltage. This type of driving scheme that means no necessity of initialization scheme for new frame writing is widely used among most of full motion video image reproduction in current available displays. Without initialization process at each new frame writing that is required for all of memory type of display, it enables full motion video image reproduction in terms of fast enough full frame writing process. FIG. 3 (b) and FIG. 4 compare whole screen writing schemes between memory type of display case and refreshing type of display case. As these Figures suggest, memory type of display requires whole screen initialization frame before new frame writing. Due to memory effect of display medium itself at each pixel, new screen image signal does not know what signal is required for each pixel, unless the previous whole screen pixel signal status and new frame whole screen signal image are compared using whole double screen frame memories in pretty short time line. This type of whole screen frame pixel signal comparison requires relatively expensive memories and their fast comparison process that are technically feasible, but economically and space wise, it is not easy. In particular, such fast signal comparison requires a certain large power, resulting in high power consumption of the display system. Therefore, automatic return to the initial state without any active action is very intrinsic requirement for refreshing type, or full motion video image reproduction. This automatic return function at fast enough optical response electrophoretic display system is provided only by anti-ferroelectric coupling torque origin and this invention introduces this proprietary and unique function with the anti-ferroelectric coupling torque uses.

In addition to the anti-ferroelectric coupling torque introduction, the invention has one more innovative technology to enable effective and practical use of anti-ferroelectric coupling torque in an electrophoretic display system.

In order to have an effective and practical use of anti-ferroelectric coupling torque, in particular for small enough pixel pitch applications, the specific process is introduced as shown in overall process flow in FIG. 8. Although there is couple of modified process in the invention process, the basic process consists of three major steps. The first step is anti-ferroelectric particles dispersion cast film formation, the second step is display panel substrate preparation process, and the third step is cell fabrication process. The detail of each step will be described below.

In general, display medium memory functional display and refreshing type of full motion video image reproduction are inconsistent in terms of their drive concept and display means. The memory type of display uses display medium's optical memory states and electronic excitation is one time or "latching" action. This means that once well enough excitation power is given to a certain pixel, the display medium sandwiched in the specific pixel changes its optical configuration, and the changed optical configuration is kept until next excitation power is given to the pixel. However, if the next excitation power is the same as the previous excitation power, the pixel will not change its optical status. Only when the next excitation is given with the different one that induces different optical status power, the display medium in the pixel changes its optical status. This is the reason why display medium memory type of display requires whole screen resetting, or initialization process before the next frame of whole screen writing. FIGS. 3 (b) and 7 (a) illustrate the general driving concept of the display medium memory function type of display. As these figures show, this type of display uses so-called line-at-a-time scan for whole screen writing. Using each strove line pixel's display medium's memory function, the energized power provided by the selected strove line and signal line changes the optical status of a certain pixel. Once, changed optical status is preserved after the energized power provided by the selective strove line and signal line is removed. Therefore, the memory type of driving scheme in principle is using display medium's memory capability, electrical excitation is just one time action. In order to rewrite the screen, regardless particle rewriting, or whole screen rewriting, the whole screen pixels are given high voltage to reset the whole screen to the same optical status. Then new line-at-a-time writing process is repeated. This resetting process is sometimes called as initialization process. Based on line-at-a-time scanning driving, this memory type of writing takes initialization time plus whole screen writing time that is given number of strove lines times each strove line excitation time. For instance, if the initialization takes 100 ms, then each strove line takes 10 ms, and number of strove lines is 1,000 lines, then the total single frame writing time is:

100 ms+10 ms×1,000 lines=10,100 ms=10.1 s

Therefore, this type of display's writing time is almost in proportion to number of strove lines regardless each line writing time is fast enough such as 10 ms. Since the nature of memory type of displays, still image writing may be fine with several seconds writing time, however, full motion video image requires no image smear. As both FIGS. 3 (b), 7 (a) and above total writing time clearly suggest that memory type of display needs to wait whole screen's strove lines are written. Until the first strove line to the 1,000$^{th}$ strove line or the final strove line is written, the screen image can't change. This is the reason why memory type of display does not have consistency with full motion video image writing. However, even a memory type of display, if it has a strove line writing time of 10 micro seconds and initialization time of 1 ms, above calculation leads to;

1 ms+0.01 ms×1,000 lines=11 ms

This number would be well enough to have non image smear type of full motion video image. However, to achieve memory type of display with full motion video image, the required optical response time is such as 10 micro seconds. This number may not be easy even using very powerful ferroelectric, or anti-ferroelectric coupling torque, in particular with wide enough temperature range, therefore, from realistic and practical point of view, it is still required to consider different driving scheme for full motion video image reproduction.

For smear-free full motion video image reproduction at an electrophoretic display, the invention introduces anti-ferroelectric coupling torque. As FIGS. 4 and 7 (b) describe refreshing driving scheme in general, one of the critical requirement of the smooth refreshing driving is automatic recovery to the initial optical state before the specific driving power was given to the pixel. In another word, it is required to have no memory function at the display medium itself. As soon as energized power is removed, then, the pixel immediately returns to the original optical state. This is the most required characteristic performance for smooth refreshing driving, and full motion video image driving. The U.S. patent application described above provided use of ferroelectric coupling torque for fast enough optical switching. In this invention, further investigation of driving torque, in particular the relationship between driving torque and nature of the switching particles led to use of anti-ferroelectric coupling torque. An anti-ferroelectric coupling torque works only when an externally applied energy exists, and once, the externally applied energy is removed, the driving torque disappears. A loss of driving torque means the display medium's returning to the original set position without any external intentional driving. A typical electro-optic behavior of an anti-ferroelectric material is presented in FIG. 6 (a). As shown in FIG. 6 (a), an anti-ferroelectric material does not show spontaneous polarization with absence of externally applied electric field. Once strong enough electric field is applied, then, suddenly the anti-ferroelectric material shows spontaneous polarization, and responds to the externally applied electric field. This driving torque provides rapid optical status change. As is required for all of electric field based flat panel display, a DC balance is always of their concern in terms of reliability issue as well as suppressing image artifacts. As shown in FIG. 6 (a), an anti-ferroelectric material is beneficial for a DC balanced driving in terms of light efficiency or frame duty ratio. In order to keep good enough DC balancing, all of electric field based flat panel displays require DC balanced driving. Usually, this DC balancing is realized with alternative polarity or alternative direction of applied voltage to a display panel. For instance, every odd number of frames, the whole screen is written with upward direction of driving voltage in terms of two parallel electrodes. At even number of frames, the writing voltage is provided with downward direction of voltage to keep a balance between upward and downward voltages. In some cases, unlike odd and even numbers of frames, each strove line driving uses upward and downward alternatively to keep DC balance in a short time frame. For this DC balancing driving, an anti-ferroelectric coupling driving maximize light throughput as shown in FIG. 6 (a). Regardless upward and downward voltages, an anti-ferroelectric material shows light through or light blocking, and all of DC balancing drive time frame, this type of devices show "on" or "off" display states, resulting in maximum use of time-display relationship. Compared to an anti-ferroelectric case of its electro-optic relationship shown in FIG. 6 (b), a ferroelectric coupling case uses only one direction of spontaneous polarization with light throughput as illustrated both FIGS. 5 (a) and (b). For instance, if spontaneous polarization of upward passes through light, then downward od spontaneous does not pass through light. Due to DC balancing requirement, half duty of frame time, a ferroelectric coupling torque loses light throughput. Therefore, an anti-ferroelectric based coupling torque provides double light throughput compared to that of a ferroelectric coupling torque based devices in general.

The major benefit of use of an anti-ferroelectric coupling torque in an electrophoretic display is, however, its spontaneous polarization appearance only when external electric field is applied. When no electric field is applied, the switching particle consists of anti-ferroelectric material does not have any spontaneous polarization, and does not have any material's memory capability of optical states. Therefore, for refreshing driving that is time dependent applied voltage writing method has great matching with an anti-ferroelectric coupling torque.

As an actual function of the anti-ferroelectric coupling torque confirmation of the invention, following system was applied. For sustaining medium of this specific electrophoretic display system, a thixotropic fluid was prepared as described in International Patent Application No. PCT/EP2010/057865. Using 5 centi-stroke of silicon based fluid from Aldrich Chemicals, 20 wt % of fumed silica made of silicon dioxide particles (averaged particle size is about 200 nano meters) were added to the silicon based fluid, and these were mixed by a homogenizer. After the mixed fluid of silicon base fluid and fumed silica particles formed thixotropic fluid, 10 wt % of $PbZrO_3$ nano sized particles as an anti-ferroelectric particles were mixed to the thixotropic fluid. This mixture was filled in an ITO transparent electrode coated pair of glass substrates with its panel gap of 80 micron. The filled panel was applied 100 Hz of triangular wave form of voltage with peak to peak of 50 V. The transient current of the panel showed a typical anti-ferroelectric materials transient current that had two polarization switching peak current during application of same polarity of applied voltage that is a clear evidence of the anti-ferroelectric polarization switching.

The fundamental principle of the invention for fine pitch switching element of an electrophoretic display is the switching element preparation by photolithography. Unlike well-known electrophoretic principle, the concept of dispersion of switching particles is not used. Instead of using dispersion process, photolithography process that has been well-established in current flat panel display manufacturing industry in general is used. The biggest benefit of photolithography based electrophoretic display is a compatible fine pixel resolution with current fine pitch flat panel display technologies such as LCDs and OLEDs. Moreover, fine pixel pitch preparation of the electrophoretic display technology does not require any new manufacturing process in terms of volume manufacturing process. In order to apply current well-established flat panel display volume manufacturing process technology, new concept of spontaneous polarization based particle contained casting film has been proposed. This composite casting film also consists of photo reactive material.

FIGS. 9-19 show process steps of making an electrophoretic display device, in which a photolithographic process is used. As shown in FIG. 12, the polymer layer patterned by the photolithographic process stays with the electrode substrate.

FIG. 9 represents a preparation process of the photo reactive casting film, and this particular casting film preparation process consists of three major steps. The first step is preparation of the specific casting film case. The second step is slurry preparation. This slurry consists of photo reactive polymer such as PMMA (poly methyl meta acrylate) with photo initialization material, and anti-ferroelectric small particles such as $PbZrO_3$ nano-sized particles. Depending on required pixel resolution, the casting film thickness is tunable such as few micron to several tens of micron. The casting film thickness is controlled by the amount of poring slurry to the casting film forming case. If very accurate thickness control is required, a slit coating method is applied to transfer the mixed slurry to the casting film formation case. The thickness control by a slit coater is with distance of two metal shim, pressure of slurry fluid to the shim, distance between the edge of shim and the case plate surface, and sliding speed of the shim, and so on. The third step is to form casting film consisting of photo reactive polymer and anti-ferroelectric element. This slurry preparation method has been thought out specifically for the invention, however, this exact slurry preparation method is also effectively used for ferroelectric switching element for an electrophoretic display. Just instead of mixing anti-ferroelectric particles, using ferroelectric particles, the casting film forms ferroelectric coupling torque switching element including optional use of electronic poling after the casting film is dried as shown in FIG. 10. However, for anti-ferroelectric casting film, any electron poling is not recommended to avoid induced ferroelectric phase transition from anti-ferroelectric phase. The dried casting film is moved to coloration process. One side of the casting film is printed specific color by printing method. If the casting film formation process used an electron poling using FIG. 10 equipment, then, the specific side of the film is selected as a printing side. If the color printing does not have patterning, slit coating is applied as well as flexo printing, off-set printing. Of course, depending on required coloration thickness pattern pitch and so on, printing method is not limited in above printing method. The colored casting film consists of polymer network film of anti-ferroelectric or ferroelectric switching elements.

After an anti-ferroelectric element containing casting film with necessary coloration is prepared, then, next step is lamination on the specific electrode patterned substrate. This specific substrate must be prepared for half-cured or non-final cured perimeter seal patterning as shown in FIG. 11. FIG. 11 illustrates half-cured perimeter seal pattern with at least one open area. The used electrode substrate is not limited transparent patterned electrode, but includes reflective or metal electrodes, active matrix array electrodes an so on. The dried casting film is removed from the casting film forming case, and transfer to the perimeter seal patterned substrates. Depending on the electrode patterning and casting film nature, the film and substrate will be aligned of their pixel pattern with positioning registration process. FIG. 12 shows a case of patterned black dot on the specific side of the casting film. The black area of the casting film is aligned with electrode pattern. After the casting film and the electrode substrate are laminated, then, from casting film side, UV light is exposed for positive pattern formation of the casting film as shown in FIG. 12. After the UV exposure, the laminated film is developed by wet method. The light exposed area is eliminated by the development process, resulting in small and thin colored switching element is left on the substrate as illustrated in FIG. 12. When the substrate has reflective electrode such as metal electrodes, a non-patterned colored casting film is laminated without specific position registration as shown in FIG. 13. Thanks to non-transparent patterned pixel on the substrate, the electrode substrate is used as a photo mask. Therefore, this case is used a self-aligned photo lithography method as shown in FIG. 13. Both FIGS. 12 and 13 suggest, required color layer on the casting film is dependent on lamination substrate nature, specifically electrode's optical status. As shown self-alignment method in FIG. 13, this case does not require patterning of the color layer, then, simple color layer preparation is used as shown in FIG. 14, including color film lamination method to the casting film. When, some patterning is required as illustrated in FIG. 15, a typical and well-established industrial method of flexo printing would be the most reliable and established manufacturing method. Using multiple flexo printing methods, plural patterned color printing as illustrated in FIG. 16 is also prepared. Also, in the case of specific display image quality is required such as high contrast image, additional black dot printing is formed as illustrated in FIG. 17. These flexo printing or off-set printing method is widely used for very fine pitch pattern formation, when specific consecutive process is required at a certain flat panel display manufacturing, photo lithography method is also applicable to have colored switching element on a display substrate. Since, similar micro-color filter forming process is widely used as a part of large LCD panel manufacturing, a photo lithography method has good compatibility with current established LCD manufacturing process as illustrated in FIGS. 18 and 19. Since, the invention is proving practical and higher performance electrophoretic display manufacturing technology, well enough compatibility with current volume manufacturing process is also of the scope of the invention.

Depending on display function such as fine pitch full color version, after the proper anti-ferroelectric switching element is prepared on a perimeter seal equipped substrate, next step is pouring thixotropic fluid with showering method. The amount of pouring thixotropic fluid is preliminary measured by its weight, and specific weight amount of fluid is poured on the switching element equipped substrate. The amount of fluid should be a slightly excess amount of the panel internal volume after two substrates formed a panel. Normally the excess amount is about 2%, however, depending on actual panel size, the excess amount varies between 1% more to 5% more. After the fluid is poured, and the counter substrate is laminated, the excess amount of fluid is eliminated from the open area of the perimeter seal pattern, and the laminated panel gap specifies a proper amount of fluid in the panel. After the open area(s) is cleaned by wiped away of the excess amount of fluid, then, the open area and all of perimeter seal are applied final cure process. Depending on the used perimeter seal material, the final cure is selected whether UV exposure, and/or thermal curing.

When the specific anti-ferroelectric or ferroelectric display media are used in conjunction with independently prepared micro-color filter just similar with current TFT-LCDs and/or TFT-OLEDs, as a different display panel fabrication method, following process is applicable. FIGS. 20-23*b* show another process steps of making an electrophoretic display device. Unlike the process steps shown in FIGS. 9-19, no photolithographic process is used for display medium switching layer preparation. Rather, the particles are suspended in a fluid, and the fluid is inserted into a cell pre-formed with two substrates.

After the casting polymer network anti-ferroelectric or ferroelectric dispersed colored film was prepared, this polymer network film is milled by a micro-milling machine. This micro-milling was performed, for example, by commercially available milling machine with drilling fixture. The casting polymer network film is drilled by a milling machine to make small pieces such as smaller than several micron sized in average. This mechanical drilling process was found to give rise to well enough anti-ferroelectricity and/or ferroelectricity to displacement type or ceramics based anti-ferroelectric and/or ferroelectric materials. The micro-milling process needs to consider keeping coloration layers well enough preserved. In most of cases, thanks to very tinny milling result, the coloration layers are well enough preserved after the micro-milling process.

The micro-milled polymer networked particles were dispersed in supporting fluid such as silicon oil, but not limited in silicon oil. Any chemically and physically non-reactive fluids are applicable regardless Newtonian or non-Newtonian fluid. Depending on display configuration such as reflective only, selection of supporting fluid is also not limited in transparent fluid, but also black-colored or any other colored fluid is applicable. For transparent type display configuration, transparent type of fluid is used for supporting medium selection. Due to the required function of the supporting fluid media, silicon oil, hydrocarbon based fluid such as heptane, glycol based fluid and so on are applicable. Using proper fluid for proper display configuration, the micro-milled colored polymer network film is dispersed in a fluid, then the dispersion fluid is filled in a panel equipped with micro-color filter. In this case, current well-known micro-color filter equipped TFT panels are applicable. FIG. 20 is an example for this particular application. The TFT array is prepared with current state-of-art technology such as amorphous silicon TFT array with pillar spacer arrays. The counter common electrode consists of ITO electrode is equipped with micro-color filter array. These TFT array and micro-color filter array are laminated with conventional manufacturing method such as large TFT-LCD manufacturing process. After the lamination, the micro-milled polymer networked dispersion material is filled using a slit coating, a multiple nozzle showering method and so on. FIG. 20 is an example of use model of this invention as a transparent display system. For transflective and/or reflective use model, FIG. 21 display configuration is applicable. In FIG. 21 display configuration, so-called COA (Color filter on Array) display structure is applied. Instead of using separated micro-color filter array from TFT array substrate, micro-color filter is formed on each corresponding pixel at TFT array substrate. In this display configuration, the micro-milled polymer network dispersed particles dispersed in a supporting fluid works as incident light controlled medium to the COA.

FIG. 22 illustrates a single pixel at a TFT based display screen. The yellow color filter is formed on the TFT array as a single pixel as shown in FIG. 22. An anti-ferroelectric particle element specified with both up-ward and down-ward arrows in FIG. 22 on the yellow color filter array is dispersed in a sustaining transparent fluid such as silicon oil. When no electric field is applied to each switching element, switching elements shown in FIG. 22 do not have any actual movement. Without any actual movement of each switching element, some of incident visible white light penetrate the switching elements and reach at the yellow color filter. The reached white light is absorbed except for yellow range of wavelength, and only yellow range of wavelength light is reflected by the yellow color filter. The reflected yellow color light comes back to view's side, resulting in yellow color pixel. With same principle, other subtract primary colors are reproduced with cyan color filter, magenta color filter, and black color filter. When a proper electric field is applied to the pixel, each switching element changes its spontaneous polarization along with applied electric field direction every time the applied electric field changes its direction. Along with the spontaneous polarization direction switching, the switching element changes its whole element direction as shown in FIGS. 23 and 23-*a*. When the applied electric field direction is switching fast enough compared to human eye-sight recognition range such as faster than 60 Hz, every time switching elements change their directions, incident white light is scattered by the switching element. The light scattering is mostly based on diffraction scattering due to the size of each switching element. The average size of the switching element is designed such as smaller than visible light wavelength (smaller than 0.5 micron). With such a small particles, incident visible light having over 0.5 micron wavelength does not show any significant interaction with each particle as long as the particles do not show any particular movement. When the particles have fast enough movement compared to human eye recognized time resolution such as faster than 60 Hz, the incident light having 0.5 micron wavelength light beam recognizes some particles which have interactive performance with incident light beam. Due to rapid moving of the small switching elements, such moving elements provide time and spatial interaction with visible wavelength as diffraction light scattering. Such diffraction light scattering is, however, limited only local light scattering as shown in FIG. 23. Such diffraction light scattering created by time and spatial effect of small switching particles provide milky whitish light scattering to the display viewer. Therefore, FIG. 23 configuration gives rise to milky whitish view at the yellow color-filtered pixel when an appropriate drive voltage is applied to the pixel.

With above principle, FIGS. 22 and 23 with 23-a configuration reproduces yellow and white color pixel depending on applied electric field selection. As FIG. 22 illustrates, when a specific pixel needs to show specific color dot such as yellow color dot, the specific pixel voltage is controlled to eliminate spontaneous polarization to all of corresponding pixel area's switching particles. This is usually realized by giving the specific voltage between 0 V to + or −V V in FIG. 3 (a). However, this applied voltage is one of the examples, and it is not limited in this voltage application. In this invention of anti-ferroelectric switching particles, when each particle's spontaneous polarization is removed or spatially cancelled, each switching particle takes random orientation, resulting incident light beam from ambient illumination light reaches at the pixel color filter on COA, then, colored incident light beam is reflected on the COA, provides reflected color image. When the pixel voltage is controlled +2V V or −2V V in FIG. 3 (a), the switching particles on the specific pixel have a certain spontaneous polarization as the nature of anti-ferroelectric material, then, the switching elements show dynamic light scattering and the incident light beam is blocked from color filter at COA, resulting black image or white image depending on normally black image or normally white image as shown in FIG. 23.

Although the description above applies to the operation of a pixel formed by the process steps in which no photolithographic process is used for preparation of light switching elements layer preparation, it also applies to the operation of a pixel formed by the process steps in which a photolithographic process is used, such as the one shown in FIG. 12. In this example, however, light enters the polymer layer having the particles through the electrode substrate, because the top surface of the polymer layer, which is away from the electrode substrate, is printed with a black dye. Both with and without photolithography process, the display image configuration based on this invention allows both still image with display medium memory function and full motion video image based on the dynamic light scattering mechanism. Selection of still image with memory function and full motion video image with dynamic light scattering function is just a matter of drive voltage matter. When only still image with memory function is used, after whole screen writing-in, then drive voltage is simply removed, then each written pixel is held as its optical status till next frame of writing voltage is applied. When full motion video image is deployed, a typical motion video image driving method such as frame inversion of 60 Hz of continuous drive voltage is applied to the panel, then, above described dynamic scattering phenomenon occurs, resulting in full motion video image display.

A preparation of micro-milled anti-ferroelectric and/or ferroelectric switching particles in a polymer network is carried out with some modification of above discussed casting film preparation.

In general there are two ferroelectric/anti-ferroelectric switching element preparation methods based on their process order. One is to prepare ferroelectric/anti-ferroelectric particles first, then polymer matrix is applied to each prepared ferroelectric/anti-ferroelectric particle. The other method is first, to provide para-electric particles. Those are potentially capable to turn to ferroelectric/anti-ferroelectric particles, but do not show ferroelectric/anti-ferroelectric performance such as multi-domain ferroelectric/anti-ferroelectric materials. They are mixed with polymer materials and formed into polymer matrix casting film. After polymer matrix is formed, then, micro-milling process is applied to the film, resulting in ferroelectric/anti-ferroelectric particles.

The applicable or practically effective micro-milling process is achieved by following method. However, the following method is one example and is not limited to the following method to obtain target level of spontaneous polarization to the particle.

Here, there are also two methods in terms of milling materials. One is to mill potential ferroelectric/anti-ferroelectric metal oxide material itself. The other is polymer matrix type of material consists on both metal oxide material and polymer material. The only difference in above two cases is size of actual milling material and milling condition. Using a micro-milling drilling machine as illustrated in FIG. 23-b (1), either metal oxide itself or polymer combined metal oxide material is drilled mechanically. Depending on a target size of milled particles, drilling condition such as drill rotation velocity, drilling time is decided. For drilling of a metal oxide only material, used drill should be hard type such as artificial diamond layer is coated is preferable. The other method to have effective milling is using micro-ball-milling machine as illustrated in FIG. 23-b (2). This method is more effective for polymer matrix type of materials. As a practical effect, micro-milling would provide some sort of mechanical stress, mechanical distortion to the para-electric metal oxide which has potential capability to have a spontaneous polarization. Such mechanical stress would provide well enough spontaneous polarization to the metal oxide material. Therefore, actual effective method to have well enough spontaneous polarization is not limited above described micro-milling process as long as well enough mechanical stress is applied to the potential ferroelectric/anti-ferroelectric materials. This method to have tiny ferroelectric/anti-ferroelectric particles is, therefore, not limited in metal oxide materials, but includes some order/disorder type of ferroelectric/anti-ferroelectric materials such as polymer material.

Actually, the preparation of specific polymer networked dispersion film is basically sharing same concept with above discussed method. Here the definition of polymer network dispersion film is specifically relatively low molecular weight polymerization, and/or lower three dimensional cross linking polymer condition. Actual numerical definition of polymer network is depending on film thickness and concentration of dispersed switching particles. Moreover, the definition is also dependent on required physical pixel size. For relatively large sized pixel such as 1 mm×1 mm size, an applicable polymer's polymerization level of 10,000 or less. On the other hand, when a smaller pixel pitch is used such as several hundreds of micrometer squire, an applicable polymer's polymerization level is 5,000 or less.

In order to control polymerization level that means control of polymer network density, both selection and concentration of polymerization initialization materials and polymerization condition are most important. In general, preferable polymerization initiator for acrylic resin such as PMMA is a peroxide type such as PERBUTYL I (NOF Corporation). A detailed thermal polymerization and radicals polymerization conditions using peroxide type of polymerization initiator is reported such as Citation of Tokyo Gakugei University Repository: "Dependence of Polymerization Time on Thermal Concentration"; Bul. Tokyo Gakugei University, Sect 6, 56 5-8 (2004).

As one of examples of preparation of polymer matrix ferroelectric/anti-ferroelectric particles, following method is effective. Using FIG. 23-b (1) drilling machine, a metal oxide such as $PbZrO_3$ nano particles are drilled. Although commercially available those particles have nano-sized unit particle, most of those small particles form some size of aggregation, resulting in at least several micron size of cluster. Those several micro-meter sized cluster particles are micro milled using FIG. 23-b (1) type of micro-drilling machine. After the micro-drilling, the several micro-meter sized clusters are separated to several hundreds of nano-meter sized smaller particles with spontaneous polarization. Those micro-milled particles are separated through micro-mesh layer beneath the micro-milling driller using its mechanical vibration power, the micro-milled particles pass through the mesh. Using these smaller particles having spontaneous polarization particles, photo-polymerizing capable monomer is mixed with the particles with a proper amount of photo-initiator material. Those three materials are mechanically mixed such as stirred by some mixing equipment such as propeller type of mixer. After those three were well mixed, then, the slurry type of mixture is casted in a proper vessel. The, the casted film is exposed by UV light such as i-line UV light. This UV exposure promotes polymerization of the polymer material. This polymerization forms some sort of polymer network for each micro-milled particles, and forms polymer sustained small particles having spontaneous polarization.

EXAMPLES

Example 1

Anti-Ferroelectric Coupling Torque with and without Applied Voltage

Using 5 centi-stroke of silicon based fluid from Aldrich Chemicals, 20 wt % of fumed silica made of silicon dioxide particles (averaged particle size is about 200 nano meters) were added to the silicon based fluid, and these were mixed by a homogenizer made by IKA Laboratory Technology: type T25. After the mixed fluid of silicon base fluid and fumed silica particles formed thixotropic fluid, 10 wt % of $PbZrO_3$ nano sized particles as an anti-ferroelectric particles were mixed to the thixotropic fluid. This mixture was filled in an ITO transparent electrode coated pair of glass substrates with its panel gap of 80 micron. The panel gap of 80 micron was sustained using 80 micron thickness plastics film made of TAC. The perimeter area of the panel was sealed using photo reactive acrylic resign of Norland 68. The panel had physical dimension of 35 mm×60 mm (about 4 inches diagonal size), and the panel's electrode area was 20.4 $cm^2$. The ITO electrode did not have specific patterning, but simply coated at entirely area of each substrate. This ITO electrode layer was formed with low temperature DC sputtering method. The filled panel was applied 100 Hz of triangular wave form of voltage with peak to peak of 50 V. For the spontaneous polarization amount measurement, Sawyer-Tower bridge circuit was prepared. Used external capacitance and resistance were 22 nF and 10 k☐, respectively. The transient current of the panel showed a typical anti-ferroelectric materials transient current that had two polarization switching peak current during application of same polarity of applied voltage that is a clear evidence of the anti-ferroelectric polarization switching.

When frequency of 100 Hz and peak to peak 50 V of rectangular voltage was applied to this panel, the observed current was 30 ☐A. Therefore total power consumption of the panel was 1.5 mW for about 4 inches size. This simple rectangular wave form is applied to hold written image at actual pixelated display panel for the invention. This measurement was used non-pixelated panel that has about 30% more electrode area than that of pixelated panel. Even the extra electrode area's influence of extra current, still the total power consumption at the image holding mode was 1.5 mW for 4-inch size panel. In comparison with a typical color TFT-LCD panel having 4-inch diagonal size, it typically requires about 20 mW just for keeping its display image without back light power consumption. The invention, therefore, provided approximately $\frac{1}{13}^{th}$ of power consumption of current typical LCDs with same screen size.

Although this simple panel experiment did not provide actual data, it shows that the invention is applied to refreshing full motion video image display, the power consumption of screen image data processing does not have any difference from that for typical TFT-LCDs case, therefore, taking into account this measurement data for the invention, even for refreshing driving, the invention still keeps lower power benefit compared to current typical LCDs.

Example 2

Anti-Ferroelectric Coupling Torque with and without Applied Voltage; Different Shape Using 0.65 centi-stroke of silicon based fluid from Aldrich Chemicals, 70 wt % of $PbZrO_3$ nano sized particles as an anti-ferroelectric particles were mixed to the silicon fluid. This mixture formed slurry. As a sample panel to evaluate the anti-ferroelectric particles fluid, following specific sample panel was prepared. The ITO coated glass substrate having its thickness of 1.1 mm, and 30 mm×60 mm size was prepared. The ITO layer was prepared by low temperature DC sputtering method. The ITO layer thickness was 800 A. This substrate surface was cleaned with acetone and IPA consequently. After the remaining IPA was evaporated in a vacuum oven keeping its temperature at 90 degrees C., 30 minutes, using a doctor blade having its height of 30 micron, the anti-ferroelectric slurry was coated on the one substrate. The coated area of the slurry was about 20 mm×20 mm. The counter ITO coated substrate had same physical dimension with the slurry coated substrate. The counter ITO coated substrate was dispersed 30 micron spacer balls (Sekisui Chemicals) with about 7 to 8 particles per 1 squire millimeter density. The spacer dispersed counter ITO substrate was laminated with the slurry coated substrate. After the lamination, the perimeter area was glued by Norland 68 acrylic resin. The laminated panel was put into a vacuum bag. UV black light was exposed from the vacuum bag, then, the perimeter area of glue was cured.

The panel was applied 120 Hz, peak-to-peak of 25 V of rectangular voltage, and both spontaneous polarization switching peak current and displacement current were measured. For the spontaneous polarization amount measurement, Sawyer-Tower bridge circuit was prepared. Used external capacitance and resistance were 22 nF and 10 k☐, respectively. This transient current measurement clarified double peak current switching that was the clear evidence of anti-ferroelectric polarization switching. The transient current was also measured for evaluation of total power consumption of the panel at the switching of the anti-ferroelectric particles in the panel. The consumption power at the holding state which is for "memory state" image holding state was also measured applying static holding voltage of 120 Hz, 20 V static voltage. Table 1 shows the power consumption as the sample panel power measured and the calculated to 9" diagonal 16:9 aspect ratio panel case based on the data.

TABLE 1

Measured holding image power with 4" diagonal panel and calculated holding image power with 9" diagonal

|  | 4" size panel | 9" size panel |
| --- | --- | --- |
| Actual measured power (mW) | 1.5 | — |
| Calculated power (mW) | — | 7.6 |

As Table 1 shows, this example based on the invention clearly provide very low power consumption compared to conventional LCD panel with equivalent active image area.

Example 3

Fine Pitch Patterned Electrophoretic Display

In order to prepare fin pitch pattern pixel configuration such as pixel pitch of 100 micron×100 micron size, first of all, a casting film preparation case was formed. The overall schematic is same with in FIG. 11. The prepared physical dimension was 4 inches by 5 inches with wall height of the FIG. 11 of 1 inch. The bottom substrate of the case was used stainless steel, and peripheral walls were made of same stainless steel. These walls were welded. The open wall areas had half inch window at both upper and bottom side as shown in FIG. 11.

For anti-ferroelectric switching particle, average sizes of 1 to 3 micron particles of $PbZrO_3$ were prepared. 30 wt % of $PBZrO_3$ particles were used with following polymer network supporting medium.

For polymer network supporting material, 8.7 g of MMA (Methyl Meta Acrylate) was mixed with 0.3 wt % of PER-BUTYL-I (NOF Corporation). Above prepared $PbZrO_3$ particles were mixed with the MMA and PERBUTYL-I mixture. Then these mixtures were mixed using a three-axis roller milling machine. After mixed, the mixture was put on the above prepared case. This mixture with the above case was intended to have 50 40 micron thickness casting film after the UV exposure. With careful pouring of the mixture into the case without including air at the process, uniformly developed mixture fluid was formed in the case. Here in order to avoid flowing out of the mixture both at the opening areas, two opening windows were closed with stainless steel plates.

Then, this case was put into clean oven elevated temperature at 75 degree C. In order to have uniform thickness casting film, the case was carefully placed in the clean oven keeping strict horizontal level. The case was placed 15 hours in the clean oven kept its elevated temperature at 75 degree C. After the thermal polymerization process, the case was taken out from the oven, and the solid film was peeled off from the both upper and bottom open window area. Using carbon black paste, the upper side of the film was printed the carbon black ink with approximately 1.5 micron thickness using flexo-printing system. After the black ink was dried at 60 degree C., three hours, then, bottom side of the film was printed with Titanium white ink paste with same flexo-printing method. The white layer had approximately 1 micron thickness. After those two coloration layers were completely dried, the film was then, put on the stage of micro-milling machine, and made micro-milling. Used drill fixture was so-called glass drill in order to avoid cross contamination of drill's cracking by ceramics based anti-ferroelectric material. The micro-milling casting film was mixed with 20 centi-stroke of silicon oil. The mixing weight ratio was 50 wt % of micro-milled particles and 50 wt % of silicon oil.

In order to confirm 100 micron×100 micron size resolution of the prepared display medium, following glass substrates with transparent and metal patterned electrodes were prepared. The bottom substrate had 100 micron width of chromium oxide and metal chromium striped electrodes with gap of 100 micron. As shown in FIG. 24, the prepared patterned electrodes were with line and space of 100 micron. The counter transparent electrode had ITO non-patterned electrode. These two electrodes glass substrates were laminated using 50 micron diameter sized plastic ball spacers. The spacer balls were dispersed using so-called wet dispersion method. 0.05 wt % of 50 micron spacer balls were dispersed in IPA. This dispersed mixture was applied ultra-sonic power at 40 W, 10 minutes. Then small amount of the dispersion fluid was spin coated on the ITO glass substrate with 150 rpm, 10 seconds, followed by 600 rpm, 20 seconds. After spin coated, the substrate was dried at 80 degree C. 5 minutes on a hot plate. Then, the spacer spread substrate and metal electrode substrate were laminated using Norland 68 glue with their four peripheral area keeping 8 mm open span at one side for filling hole. This laminated panel was put into a vacuum bag, then the bag was sealed with sacked internal air by vacuum sealer machine. The vacuum bag was exposed I-line of UV light for curing of Norland 68 glue. After the lamination was completed, the empty panel was filled with above silicon oil dispersed display medium using vacuum chamber. After the medium was filled completely in the laminated panel, then, filling hole area's excess amount of medium was wiped off, then, sealed with same Norland 68 glue.

The prepared panel was measured if it had well enough display resolution meeting 100 μm resolution as following.

As shown in FIG. 24, all 100 μm lines were connected to driver power supply as shown in FIG. 25. The counter common ITO electrode was connected to the power supply as shown in FIG. 25. With applying + and −30 V, 180 Hz of rectangular waveform, each crossing point between metal electrode and transparent electrode as shown in FIG. 24 was detected with its optical response using FIG. 25 detecting system. With FIG. 25 detection system, each 100 μm sized crossing point of optical response was confirmed as clear following of applied voltage.

The invention provides two innovative technology to an electrophoretic display. One is high duty ration of fast response antiferroelectric coupling torque display technology. Thanks to anti-ferroelectric coupling torque, both power saving still image display and non-memory based smear free full motion video display are consistently realized by selecting driving scheme.

The other innovative technology is "non-dispersed" electrophoretic display technology. In some sense, non-dispersed is not quite sure, if it is called as "electrophoretic" display or not. However, the invention still uses small particle dispersed photo reactive media, therefore, it would be fine to belong to the category of electrophoretic displays. Regardless its categorization, photo lithography based small switching element preparation enables extremely fine pixel pitch in an electrophoretic display keeping well-established volume manufacturing practice endorsed by current on-going LCDs and OLEDs volume manufacturing process in general.

The invention consequently enables fine pitch pixel compatible with current LCDs, OLEDs, full color, full motion video image electrophoretic displays with using current well-established volume manufacturing process.

What is claimed is:

1. An electrophoretic display comprising:
a top substrate;
a bottom substrate;
a display medium comprising anti-ferroelectric particles and disposed between the top and bottom substrates; and
electrodes that are configured to apply to the display medium a first voltage to induce spontaneous polarization in the anti-ferroelectric particles,
wherein the anti-ferroelectric particles are configured to reflect ambient light so that the display acts as an electrophoretic display.

2. The electrophoretic display of claim 1, wherein the electrodes are configured to apply to the display medium a second voltage that is lower than the first voltage to cancel the spontaneous polarization and to drive the anti-ferroelectric particles at a high frequency.

3. The electrophoretic display of claim 1, wherein the bottom substrate includes a TFT array and a color filter array.

4. The electrophoretic display of claim 1, wherein the display medium comprises a photolithographic polymer.

5. The electrophoretic display of claim 1, wherein the display medium comprises a fluid supporting the anti-ferroelectric particles.

6. An electrophoretic display comprising:
a top substrate;
a bottom substrate;
a cast and patterned photolithographic polymer film that is disposed between the top and bottom substrates and comprises ferroelectric or anti-ferroelectric particles,
wherein said ferroelectric or anti-ferroelectric particle are configured to reflect ambient light so that the display acts as an electrophoretic display.

7. The electrophoretic display of claim 6, wherein different color materials are applied to top and bottom surfaces of the polymer film.

8. The electrophoretic display of claim 7, wherein the different color materials are applied to the top and bottom surfaces of the polymer film by flexo printing.

9. The electrophoretic display of claim 6, further comprising a TFT array and a color filter array.

10. A method of preparing an electrophoretic display, comprising:
mixing ferroelectric or anti-ferroelectric particles with a photolithographic polymer;
casting the photolithographic polymer mixed with the particles to form a cast photolithographic polymer layer;
placing the cast polymer layer on a first substrate comprising electrodes;
performing a photolithographic patterning on the cast polymer layer; and
placing a second substrate on the first substrate so that the patterned cast polymer layer is disposed between the first and second substrates.

11. The method of claim 10, further comprising printing a color material on a top or bottom surface of the cast polymer layer.

12. The method of claim 11, wherein the color material is printed by flexo printing.

13. The method of claim 10, further comprising filling a space between the first and second substrates with a thixotropic fluid.

14. The method of claim 10, wherein the photolithographic patterning comprises using the electrodes on the first substrate as a photo mask to form self-aligned pattern of the cast polymer layer.

15. A method of preparing an electrophoretic display, comprising:
micro-milling a colored polymer film comprising anti-ferroelectric or ferroelectric oxide to form ferroelectric or anti-ferroelectric particles;
mixing the ferroelectric or anti-ferroelectric particles with a fluid;
preparing a cell comprising a first substrate and a second substrate; and
inserting the fluid mixed with the particles into the cell.

16. The method of claim 15, wherein the micro-milling of the oxide comprises forming a polymer layer including the oxide and micro-milling the polymer layer.

17. The method of claim 15, wherein the micro-milling of the oxide comprises drilling the oxide.

18. The method of claim 15, wherein the micro-milling of the oxide comprises ball-milling the oxide.

* * * * *